(12) United States Patent
Zhang et al.

(10) Patent No.: US 12,424,180 B2
(45) Date of Patent: Sep. 23, 2025

(54) DRIVING METHOD AND APPARATUS FOR LIGHT-EMITTING SUBSTRATE, AND DRIVING CHIP AND TIMING CONTROL BOARD

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Dayu Zhang, Beijing (CN); Xinchen Ma, Beijing (CN); Zhiwei Zhang, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/724,196

(22) PCT Filed: Sep. 23, 2022

(86) PCT No.: PCT/CN2022/120772
§ 371 (c)(1),
(2) Date: Jun. 26, 2024

(87) PCT Pub. No.: WO2023/124301
PCT Pub. Date: Jul. 6, 2023

(65) Prior Publication Data
US 2025/0157422 A1    May 15, 2025

(30) Foreign Application Priority Data
Dec. 29, 2021    (CN) .......................... 202111645608.6

(51) Int. Cl.
G09G 3/20 (2006.01)
G09G 3/34 (2006.01)

(52) U.S. Cl.
CPC ......... *G09G 3/3426* (2013.01); *G09G 3/2096* (2013.01); *G09G 2320/02* (2013.01)

(58) Field of Classification Search
CPC . G09G 3/3426; G09G 3/2096; G09G 2320/02
See application file for complete search history.

(56) References Cited

FOREIGN PATENT DOCUMENTS

CN    104662596 A    5/2015
CN    111752514 A    10/2020
(Continued)

OTHER PUBLICATIONS

International Search Report and Written Opinion mailed on Dec. 14, 2022, in corresponding PCT/CN2022/120772, 14 pages.

*Primary Examiner* — Towfiq Elahi
(74) *Attorney, Agent, or Firm* — XSENSUS LLP

(57) ABSTRACT

A driving method includes: receiving a frequency modulation signal; generating a frequency modulation synchronization signal; generating an auxiliary synchronization signal when a rising edge of the frequency modulation synchronization signal is in a writing phase of a light-emitting unit group to which light-emitting data signals are last written in a previous frame period; and controlling, based on the auxiliary synchronization signal, a writing phase of a light-emitting unit group to which light-emitting data signals are to be first written in a current frame period to be staggered with the writing phase of the light-emitting unit group to which light-emitting data signals are last written in the previous frame period. The light-emitting unit group to which light-emitting data signals are last written in the previous frame period belongs to same cluster as the light-emitting unit group to which light-emitting data signals are to be first written in the current frame period.

20 Claims, 22 Drawing Sheets

(56) References Cited

FOREIGN PATENT DOCUMENTS

| | | |
|---|---|---|
| CN | 112735314 A | 4/2021 |
| CN | 113257197 A | 8/2021 |
| CN | 113539163 A | 10/2021 |
| JP | 2004-045662 A | 2/2004 |

DRIVING METHOD AND APPARATUS FOR LIGHT-EMITTING SUBSTRATE, AND DRIVING CHIP AND TIMING CONTROL BOARD

CROSS-REFERENCE TO RELATED APPLICATIONS

This application is a national phase entry under 35 USC 371 of International Patent Application No. PCT/CN2022/120772 filed on Sep. 23, 2022, which claims priority to Chinese Patent Application No. 202111645608.6, filed on Dec. 29, 2021, which are incorporated herein by reference in their entirety.

TECHNICAL FIELD

The present disclosure relates to the field of display technologies, and in particular, to a driving method and an apparatus for a light-emitting substrate, and a driving chip and a timing control board.

BACKGROUND

With the continuous development of electronic products, display frequencies of display apparatuses are also increasing. At present, more and more display apparatuses also have the function of adaptively adjusting the display frequency.

SUMMARY

In an aspect, a driving method for a light-emitting substrate is provided. The light-emitting substrate includes at least one light-emitting unit cluster, and N light-emitting unit groups in a light-emitting unit cluster are electrically connected to N first signal lines, respectively; M light-emitting units in a light-emitting unit group are electrically connected to M second signal lines, respectively; and the N light-emitting unit groups in the light-emitting unit cluster are connected to the same M second signal lines, N and M being both positive integers.

Within a frame period, the N first signal lines provide driving signals to the N light-emitting unit groups in time-division to cause the N light-emitting unit groups to be in a writing phase in time-division; and within a writing phase of the light-emitting unit group, the M second signal lines provide light-emitting data signals to the M light-emitting units in the light-emitting unit group, simultaneously.

The driving method includes: receiving a frequency modulation signal; generating a frequency modulation synchronization signal corresponding to the frequency modulation signal; generating an auxiliary synchronization signal in a case where a rising edge of the frequency modulation synchronization signal is in a writing phase of a light-emitting unit group to which light-emitting data signals are last written in a previous frame period; and controlling, based on the auxiliary synchronization signal, a writing phase of a light-emitting unit group to which light-emitting data signals are to be first written in a current frame period to be staggered with the writing phase of the light-emitting unit group to which the light-emitting data signals are last written in the previous frame period. The light-emitting unit group to which the light-emitting data signals are last written in the previous frame period belongs to a same light-emitting unit cluster as the light-emitting unit group to which the light-emitting data signals are to be first written in the current frame period.

In some embodiments, generating the frequency modulation synchronization signal includes: generating the auxiliary synchronization signal whose rising edge is after the writing phase of the light-emitting unit group to which the light-emitting data signals are last written in the previous frame period.

In some embodiments, generating the auxiliary synchronization signal whose rising edge is after the writing phase of the light-emitting unit group to which the light-emitting data signals are last written in the previous frame period includes: obtaining a start writing time point and a preset writing duration of the light-emitting unit group to which the light-emitting data signals are last written in the previous frame period; performing calculation, based on the start writing time point and the preset writing duration of the light-emitting unit group to which the light-emitting data signals are last written in the previous frame period, to obtain a target time point, a time interval between the target time point and the start writing time point of the light-emitting unit group to which the light-emitting data signals are last written in the previous frame period being greater than the preset writing duration; and generating the auxiliary synchronization signal whose rising edge is at a time point same as the target time point.

In some embodiments, performing calculation, based on the start writing time point and the preset writing duration of the light-emitting unit group to which the light-emitting data signals are last written in the previous frame period, to obtain the target time point includes: calculating a target time interval between start writing time points of two light-emitting unit groups to which light-emitting data signals are adjacently written in the previous frame period; and adding the target time interval to the start writing time point of the light-emitting unit group to which the light-emitting data signals are last written in the previous frame period, to obtain the target time point.

In some embodiments, generating the auxiliary synchronization signal whose rising edge is after the writing phase of the light-emitting unit group to which the light-emitting data signals are last written in the previous frame period further includes: using a signal duration of the obtained frequency modulation synchronization signal as a signal duration of the auxiliary synchronization signal.

In some embodiments, controlling, based on the auxiliary synchronization signal, the writing phase of the light-emitting unit group to which the light-emitting data signals are to be first written in the current frame period to be staggered with the writing phase of the light-emitting unit group to which the light-emitting data signals are last written in the previous frame period includes: controlling, when the rising edge of the auxiliary synchronization signal arrives, the light-emitting unit group that is required to write the light-emitting data signals first in the current frame period to start to write the light-emitting data signals.

In some embodiments, the driving method further includes: updating light-emitting data signals, after the writing phase of the light-emitting unit group to which the light-emitting data signals are last written in the previous frame period, and before the writing phase of the light-emitting unit group to which the light-emitting data signals are to be first written in the current frame period; and providing the updated light-emitting data signals, using the M second signal lines, to the light-emitting unit group to which the light-emitting data signals are to be first written in the current frame period, within the writing phase of the light-emitting unit group to which the light-emitting data signals are to be first written in the current frame period.

In some embodiments, the light-emitting unit group to which the light-emitting data signals are to be first written in the current frame period is a light-emitting unit group next to the light-emitting unit group to which the light-emitting data signals are last written in a writing sequence of light-emitting unit groups corresponding to the previous frame period.

In another aspect, a driving apparatus for a light-emitting substrate is provided. The light-emitting substrate includes at least one light-emitting unit cluster, and N light-emitting unit groups in a light-emitting unit cluster are electrically connected to N first signal lines, respectively; M light-emitting units in a light-emitting unit group are electrically connected to M second signal lines, respectively; and the N light-emitting unit groups in the light-emitting unit cluster are connected to the same M second signal lines, N and M being both positive integers.

Within a frame period, the N first signal lines provide driving signals to the N light-emitting unit groups in time-division to cause the N light-emitting unit groups to be in a writing phase in time-division; and within a writing phase of the light-emitting unit group, the M second signal lines provide light-emitting data signals to the M light-emitting units in the light-emitting unit group, simultaneously.

The driving apparatus for the light-emitting substrate includes: a receiving module, configured to receive a frequency modulation signal; a first generation module, configured to generate a frequency modulation synchronization signal corresponding to the frequency modulation signal; a second generation module, configured to generate an auxiliary synchronization signal in a case where a rising edge of the frequency modulation synchronization signal is in a writing phase of a light-emitting unit group to which light-emitting data signals are last written in a previous frame period; and a control module, configured to control, based on the auxiliary synchronization signal, a writing phase of a light-emitting unit group to which light-emitting data signals are to be first written in a current frame period to be staggered with the writing phase of the light-emitting unit group to which the light-emitting data signals are last written in the previous frame period. The light-emitting unit group to which the light-emitting data signals are last written in the previous frame period belongs to a same light-emitting unit cluster as the light-emitting unit group to which the light-emitting data signals are to be first written in the current frame period.

In some embodiments, the second generation module is further configured to generate the auxiliary synchronization signal whose rising edge is after the writing phase of the light-emitting unit group to which the light-emitting data signals are last written in the previous frame period.

In some embodiments, the second generation module includes: an obtaining sub-module, configured to obtain a start writing time point and a preset writing duration of the light-emitting unit group to which the light-emitting data signals are last written in the previous frame period; a calculation sub-module, configured to perform calculation, based on the start writing time point and the preset writing duration of the light-emitting unit group to which the light-emitting data signals are last written in the previous frame period, to obtain a target time point, a time interval between the target time point and the start writing time point of the light-emitting unit group to which the light-emitting data signals are last written in the previous frame period being greater than the preset writing duration; and a generation sub-module, configured to generate the auxiliary synchronization signal whose rising edge is at a time point same as the target time point.

In some embodiments, the calculation sub-module includes: a first calculation unit, configured to calculate a target time interval between start writing time points of two light-emitting unit groups to which light-emitting data signals are adjacently written in the previous frame period; and a second calculation unit, configured to add the target time interval to the start writing time point of the light-emitting unit group to which the light-emitting data signals are last written in the previous frame period, to obtain the target time point.

In some embodiments, the second generation module is further configured to use a signal duration of the obtained frequency modulation synchronization signal as a signal duration of the auxiliary synchronization signal.

In some embodiments, the control module is further configured to control, when the rising edge of the auxiliary synchronization signal arrives, the light-emitting unit group that is required to write the light-emitting data signals first in the current frame period to start to write the light-emitting data signals.

In some embodiments, the driving apparatus further includes: an updating module, configured to update light-emitting data signals, after the writing phase of the light-emitting unit group to which the light-emitting data signals are last written in the previous frame period, and before the writing phase of the light-emitting unit group to which the light-emitting data signals are to be first written in the current frame period; and a providing module, configured to provide the updated light-emitting data signals, using the M second signal lines, to the light-emitting unit group to which the light-emitting data signals are to be first written in the current frame period, within the writing phase of the light-emitting unit group to which the light-emitting data signals are to be first written in the current frame period.

In some embodiments, the light-emitting unit group to which the light-emitting data signals are to be first written in the current frame period is a light-emitting unit group next to the light-emitting unit group to which the light-emitting data signals are last written in a writing sequence of light-emitting unit groups corresponding to the previous frame period.

In yet another aspect, a driving chip is provided. The driving chip is configured to drive a light-emitting substrate to emit light. The light-emitting substrate includes at least one light-emitting unit cluster, and N light-emitting unit groups in a light-emitting unit cluster are electrically connected to N first signal lines, respectively; M light-emitting units in a light-emitting unit group are electrically connected to M second signal lines, respectively; and the N light-emitting unit groups in the light-emitting unit cluster are connected to the same M second signal lines, N and M being both positive integers.

Within a frame period, the N first signal lines provide driving signals to the N light-emitting unit groups in time-division to cause the N light-emitting unit groups to be in a writing phase in time-division; and within a writing phase of the light-emitting unit group, the M second signal lines provide light-emitting data signals to the M light-emitting units in the light-emitting unit group, simultaneously.

The driving chip includes a receiver and a processing module that are electrically connected to each other, and the processing module is further electrically connected to the light-emitting substrate. The receiver is configured to receive a frequency modulation synchronization signal. The processing module is configured to: generate an auxiliary synchronization signal in a case where a rising edge of the frequency modulation synchronization signal is in a writing phase of a light-emitting unit group to which light-emitting data signals are last written in a previous frame period; and control, based on the auxiliary synchronization signal, a writing phase of a light-emitting unit group to which light-emitting data signals are to be first written in a current frame period to be staggered with the writing phase of the light-emitting unit group to which the light-emitting data signals are last written in the previous frame period. The light-emitting unit group to which the light-emitting data signals are last written in the previous frame period belongs to a same light-emitting unit cluster as the light-emitting unit group to which the light-emitting data signals are to be first written in the current frame period.

In still another aspect, a driving chip is provided. The driving chip is configured to drive a light-emitting substrate to emit light. The light-emitting substrate includes at least one light-emitting unit cluster, and N light-emitting unit groups in a light-emitting unit cluster are electrically connected to N first signal lines, respectively; M light-emitting units in a light-emitting unit group are electrically connected to M second signal lines, respectively; and the N light-emitting unit groups in the light-emitting unit cluster are connected to the same M second signal lines, N and M being both positive integers.

Within a frame period, the N first signal lines provide driving signals to the N light-emitting unit groups in time-division to cause the N light-emitting unit groups to be in a writing phase in time-division; and within a writing phase of the light-emitting unit group, the M second signal lines provide light-emitting data signals to the M light-emitting units in the light-emitting unit group, simultaneously.

The driving chip includes: a data interface, an auxiliary synchronization signal generation circuit, and a scan control module. The data interface is configured to receive a frequency modulation synchronization signal and is further configured to receive image data. The auxiliary synchronization signal generation circuit is electrically connected to the data interface and configured to generate an auxiliary synchronization signal in a case where a rising edge of the frequency modulation synchronization signal is in a writing phase of a light-emitting unit group to which light-emitting data signals are last written in a previous frame period. The scan control module is electrically connected to the auxiliary synchronization signal generation circuit and configured to control, based on the auxiliary synchronization signal, a writing phase of a light-emitting unit group to which light-emitting data signals are to be first written in a current frame period to be staggered with the writing phase of the light-emitting unit group to which the light-emitting data signals are last written in the previous frame period. The light-emitting unit group to which the light-emitting data signals are last written in the previous frame period belongs to a same light-emitting unit cluster as the light-emitting unit group to which the light-emitting data signals are to be first written in the current frame period.

In some embodiments, the driving chip further includes: a driving control circuit and a driving module. The driving control circuit is electrically connected to the auxiliary synchronization signal generation circuit and configured to, obtain the image data and the auxiliary synchronization signal, and perform calculation to obtain light-emitting data signal corresponding to the image data. The driving module is electrically connected to the driving control circuit and electrically connected to light-emitting unit groups in the light-emitting substrate through the second signal lines, the driving module being configured to obtain the light-emitting data and provide light-emitting data signals corresponding to the light-emitting data to the light-emitting unit groups in the light-emitting substrate.

In still yet another aspect, a timing control board is provided. The timing control board includes a first substrate, a timing control circuit, and a driving chip. The driving chip is as described above. The timing control circuit is located on the first substrate, the timing control circuit being configured to receive a frequency modulation signal, and generate a frequency modulation synchronization signal corresponding to the frequency modulation signal. The driving chip is located on the first substrate and electrically connected to the timing control circuit.

In still yet another aspect, a light-emitting substrate is provided. The light-emitting substrate includes a second substrate, a plurality of light-emitting unit groups, and a driving chip. The driving chip is as described above. The plurality of light-emitting unit groups are located on the second substrate. The driving chip is located on the second substrate and electrically connected to the plurality of light-emitting unit groups.

In still yet another aspect, a backlight module is provided. The backlight module includes a light-emitting substrate and a driving chip. The driving chip is as described above. The driving chip is electrically connected to the light-emitting substrate.

In still yet another aspect, a display apparatus is provided. The display apparatus includes a light-emitting substrate, a driving chip, and a timing control board. The driving chip is as described above. The driving chip is electrically connected to the light-emitting substrate. The timing control board is electrically connected to the driving chip.

In some embodiments, the driving chip is integrated on the light-emitting substrate, or the driving chip is integrated on the timing control board.

In yet still another aspect, a display apparatus is provided. The display apparatus includes a backlight module, a timing control board, and a frequency modulation circuit. The backlight module is as described above. The timing control board is electrically connected to the driving chip of the backlight module. The frequency modulation circuit is electrically connected to the timing control board, to provide a frequency modulation signal to the timing control board.

In yet still another aspect, a non-transitory computer-readable storage medium is provided. The non-transitory computer-readable storage medium has stored computer program instructions that, when run at a processor, cause the processor to perform one or more steps in the driving method for the light-emitting substrate as described above.

In still yet another aspect, a computer program product is provided. The computer program product includes computer program instructions that, when executed on a computer, cause the computer to perform one or more steps in the driving method for the light-emitting substrate as described in the above embodiments.

In still yet another aspect, a computer program is provided. When executed on a computer, the computer program causes the computer to perform one or more steps in the driving method for the light-emitting substrate as described in the above embodiments.

BRIEF DESCRIPTION OF THE DRAWINGS

In order to describe technical solutions in the present disclosure more clearly, the accompanying drawings to be used in some embodiments of the present disclosure will be introduced briefly; obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1A:
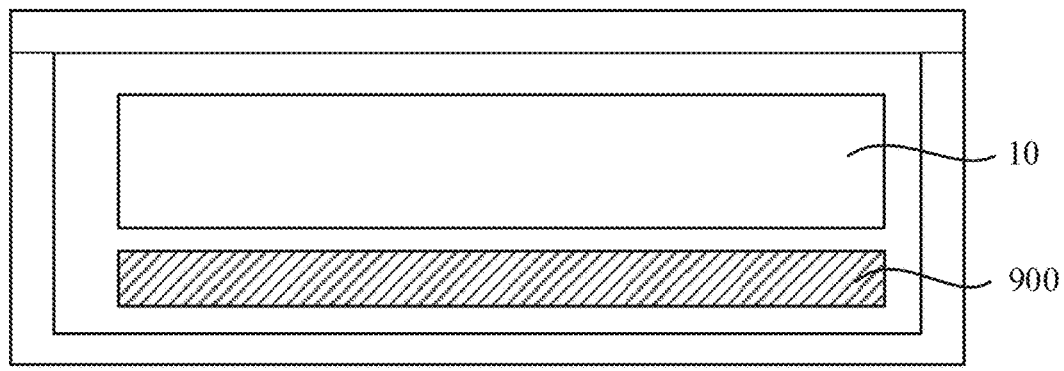
FIG. 1A is a sectional view of a display apparatus, in accordance with some embodiments.

The technical solutions in embodiments of the present disclosure will be described clearly and completely with reference to the accompanying drawings; obviously, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the features defined with "first" and "second" may explicitly or implicitly include one or more of the features. In the description of the embodiments of the present disclosure, the term "a plurality of/multiple" means two or more unless otherwise specified.

In the description of some embodiments, the expressions "electrically connected" and "connected" and derivatives thereof may be used. For example, the term "electrically connected" may be used in the description of some embodiments to indicate that two or more components are in direct physical or electrical contact with each other. The embodiments disclosed herein are not necessarily limited to the context herein.

The phrase "A and/or B" includes the following three combinations: only A, only B, and a combination of A and B.

The phrase "configured to" used herein means an open and inclusive expression, which does not exclude devices that are applicable to or configured to perform additional tasks or steps.

In addition, the use of the phrase "based on" means openness and inclusiveness, since a process, step, calculation, or other action that is "based on" one or more of the stated conditions or values may, in practice, be based on additional conditions or values exceeding those stated.

The term such as "substantially" as used herein includes a stated value and an average value within an acceptable range of deviation of a particular value determined by a person of ordinary skill in the art, considering measurement in question and errors associated with measurement of a particular quantity (i.e., limitations of a measurement system).

Exemplary embodiments are described herein with reference to segmental views and/or plan views as idealized exemplary drawings. In the accompanying drawings, thicknesses of layers and sizes of regions are enlarged for clarity. Thus, variations in shape relative to the accompanying drawings due to, for example, manufacturing technologies and/or tolerances may be envisaged. Therefore, the exemplary embodiments should not be construed as being limited to the shapes of the areas shown herein, but including shape deviations due to, for example, manufacturing. For example, an etched region shown in a rectangular shape generally has a feature of being curved. Therefore, the regions shown in the accompanying drawings are schematic in nature, and their shapes are not intended to show actual shapes of regions in a device, and are not intended to limit the scope of the exemplary embodiments.

Figure 1B:
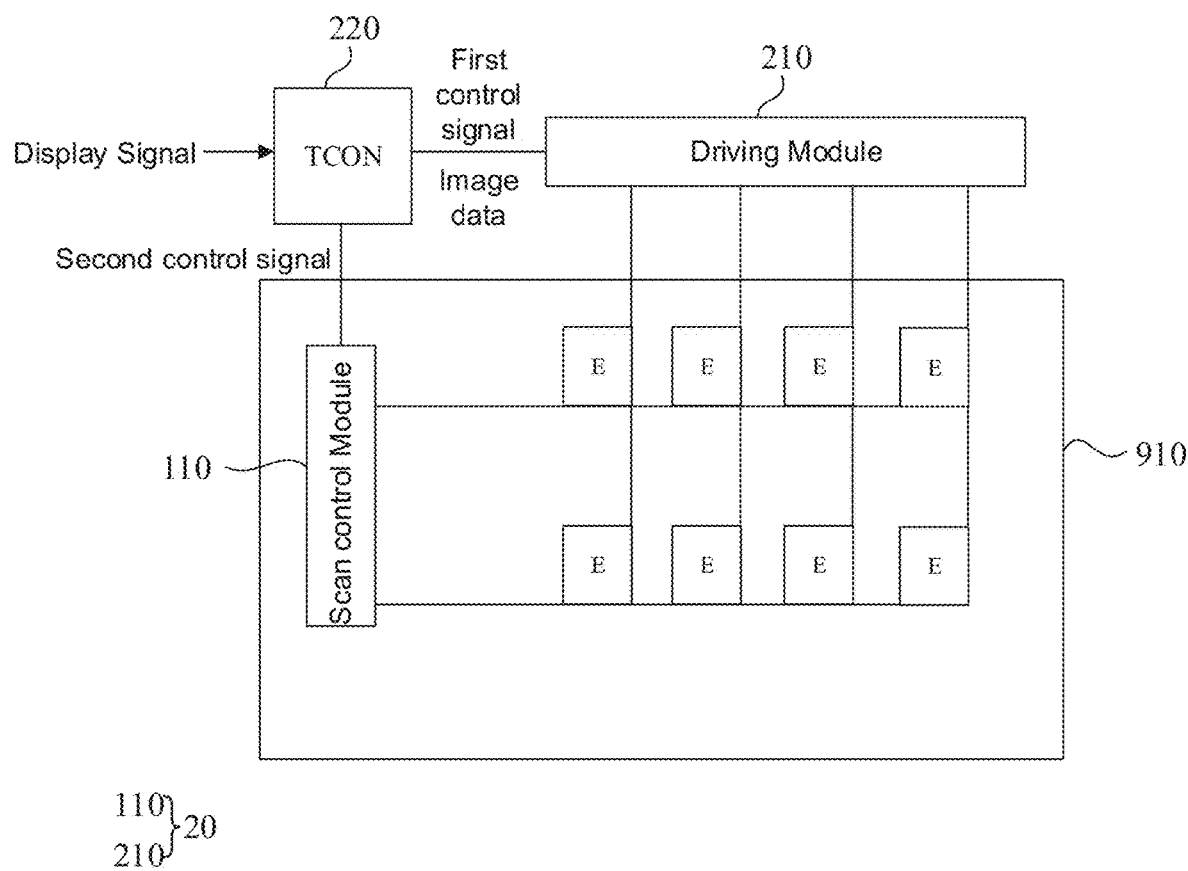
FIG. 1B is a structural diagram of a display apparatus, in accordance with some embodiments.

Some embodiments of the present disclosure provide a display apparatus, as shown in FIGS. 1A and 1B, where FIG. 1A is a sectional view of a display apparatus in accordance with some embodiments, and FIG. 1B is a structural diagram of a display apparatus in accordance with some embodiments. Referring to FIGS. 1A and 1B, the display apparatus 1 is a product having a function of displaying images (including an image in stationary or an image in motion, in which the image in motion may be a video). For example, the display apparatus 1 may be any one of a display, a television, a billboard, a digital photo frame, a laser printer having a display function, a telephone, a mobile phone, a personal digital assistant (PDA), a digital camera, a portable camcorder, a view finder, a navigator, a vehicle, a large-area wall, a household appliance, an information inquiry device (e.g., a business inquiry device for a department of e-government, bank, hospital, electricity, or the like), and a monitor.

The display apparatus 1 may include a backlight module 900 and a display panel 10. The display panel 10 is configured to perform display based on light provided by the backlight module 900. The backlight module 900 includes a light-emitting substrate 910 and a driving control circuit 20 coupled to the light-emitting substrate 910. The driving control circuit 20 is configured to provide electrical signals to the light-emitting substrate 910. By way of example, the driving control circuit (LED Driver) 20 may include a driving module (LED Driver Block) 210. The driving module 210 is configured to provide light-emitting data signals (also referred to as data signals or data driving signals) to the light-emitting substrate 910. The display apparatus 1 may further include a timing control circuit 220 (also referred to as a timing controller (Timer Control Register, TCON for short)) coupled to the driving control circuit 20, and the like.

In some embodiments, the driving control circuit 20 may further include a scan control module (SCAN Control Block) 110. The scan control module 110 is configured to output control signals to driving switches SW (e.g., SW1 to SW8) to control the driving switches SW to be turned on or off. In some other embodiments, the scan control module 110 may be integrated in the light-emitting substrate 910. In other words, the light-emitting substrate 910 may include the scan control module 110.

Specifically, the timing control circuit 220 is coupled to the driving control circuit 20, so as to indirectly control the scan control module 110 and the driving module 210.

The timing control circuit 220 may be configured to receive display signals. The display signals include, for example, a power supply signal, video image signals, a communication signal (e.g., a signal corresponding to the IIC (Inter-Integrated Circuit) communication protocol), and a mode control signal (e.g., a mode control signal corresponding to a test mode, or a mode control signal corresponding to a normal display mode), and the like. Among them, the video image signals are, for example, an MIPI (Mobile Industry Processor Interface) signal and an LVDS (Low-Voltage Differential Signaling) signal. The video image signals may include image data and timing control signals. The image data includes, for example, light-emitting data of a plurality of light-emitting units E (which will be described below). The timing control signals include, for example, a data enable signal (Data Enable, which may be abbreviated as DE), a horizontal synchronization signal (Hsync, which may be abbreviated as HS), and a vertical synchronization signal (Vsync, which may be abbreviated as VS).

In some embodiments, the timing control circuit 220 may further be configured to provide a first control signal, a second control signal, and an image signal to the driving control circuit 20, in response to the display signals. The first control signal is configured to control an operation timing of the driving module 210, and the second control signal is configured to control an operation timing of the scan control module 110.

The scan control module 110 is configured to output the control signals to the driving switches SW1 to SW8 in sequence in accordance with the operation timing determined by the second control signal, so that the plurality of light-emitting units E corresponding to the driving switches SW1 to SW8, respectively, are in a writing phase in sequence.

The driving module 210 is configured to convert the received image data into the light-emitting data signals of the plurality of light-emitting units E in the light-emitting substrate 910, and output the light-emitting data signals to the corresponding light-emitting units E in accordance with the operation timing determined by the first control signal.

In other embodiments, the timing control circuit 220 may also be configured to provide a vertical synchronization signal (VSYNC) and an image signal to the driving control circuit 20 in response to the display signal. The driving control circuit 20 is configured to receive an image signal and a vertical synchronization signal (VSYNC), and generate a first control signal and a second control signal in response to the vertical synchronization signal (VSYNC). The first control signal is configured to control an operation timing of the data driving circuit 330, and the second control signal is configured to control an operation timing of the scan driving circuit 330.

The scan control module 110 is configured to output the control signals to the driving switches SW1 to SW8 in sequence in accordance with the operation timing determined by the second control signal, so that the plurality of light-emitting units E corresponding to the driving switches SW1 to SW8, respectively, are in the writing phase in sequence.

The driving module 210 is configured to convert the received image data into the light-emitting data signals of the plurality of light-emitting units E in the light-emitting substrate 910, and output the light-emitting data signals to the corresponding light-emitting units E in accordance with the operation timing determined by the first control signal.

It will be noted that the above-described first control signal and second control signal may be different control signals. In a case where a control signal includes both the operation timing of the first control signal and the operation timing of the second control signal, the above-described first control signal and second control signal may also be the same control signal, which is not limited herein.

The light-emitting units E in the light-emitting substrate 910 may each be one of mini light-emitting diode (Mini LED), micro-light-emitting diode (Micro LED), and quantum dot light-emitting diode (QLED).

With the continuous development of electronic products, display frequencies of display apparatuses are also increasing. At present, more and more display apparatuses also have the function of adaptively adjusting the display frequency. Specifically, for display apparatuses supporting Free Sync technology, some graphics cards and APUs (accelerated processors) can directly and dynamically control a display refresh rate of the display apparatuses supporting Free Sync technology. In general, a display refresh rate of a display apparatus is fixed to a specific frequency, such as 60 Hz. In a case where an electronic device is running a game, a graphics card is able to control a display apparatus to refresh synchronously with the game. A display refresh rate of the display apparatus is capped at its maximum refresh rate, and the display refresh rate will be adjusted downward if necessary.

Figure 2:
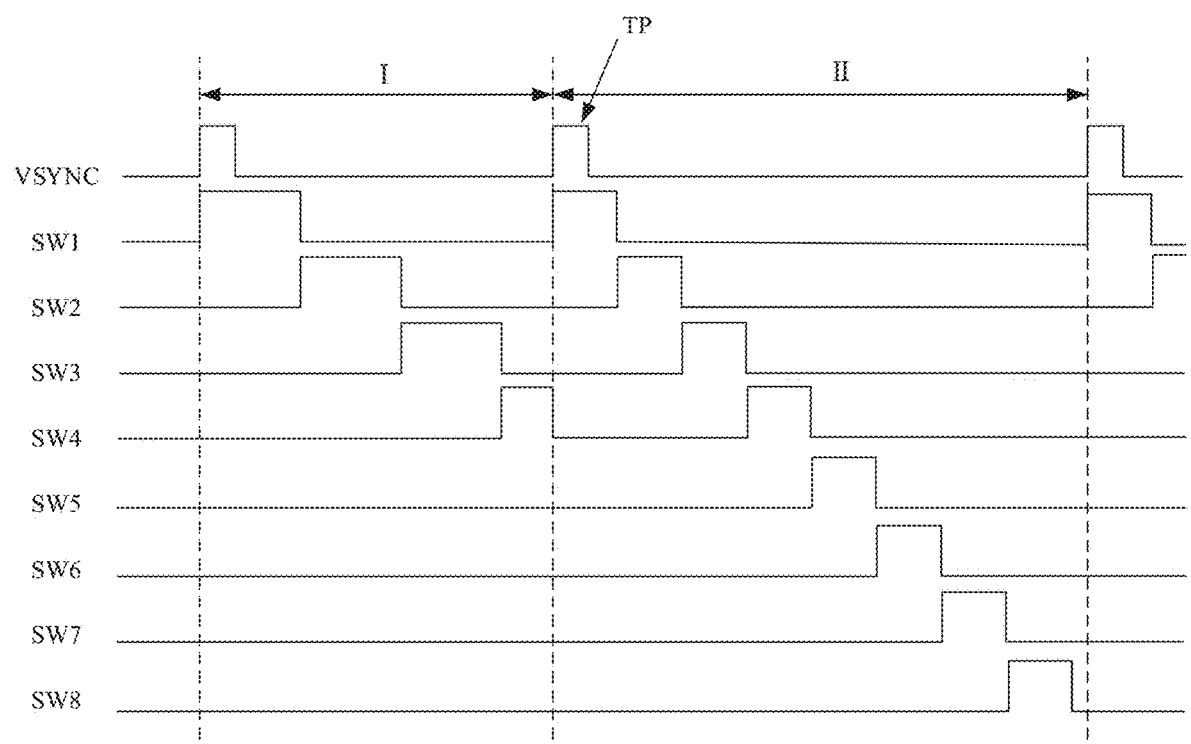
FIG. 2 is a timing diagram of driving signals of a light-emitting unit cluster, in accordance with some embodiments.

The inventors of the present disclosure have found that the graphics card outputs a frequency modulation signal (e.g., a Free SYNC signal or a G SYNC signal), which results in a frequency variation of a vertical synchronization signal (VSYNC) of the display apparatus, i.e., a change in a refresh frequency of the backlight module. In a case where the refresh frequency increases and a VSYNC period suddenly becomes shorter, the previous frame period I cannot change the internal clocks, resulting in the scan control module in the backlight module not being able to change the frequency synchronously, there will appear that a light-emitting unit group to which light-emitting data signals are last written in the previous frame period I and a light-emitting unit group to which light-emitting data signals are to be first written in the current frame period II are in the writing phase simultaneously, as shown in FIG. 2. SW1 to SW8 in FIG. 2 are driving switches in the scan control module 110 that correspond to 8 consecutive light-emitting unit groups. In the case where a switch SW receives a driving signal and is turned on at a high potential, a light-emitting unit group corresponding to this switch SW is in a writing phase. Among them, SW4 is a driving switch corresponding to the light-emitting unit group to which light-emitting data signals are last written in the previous frame period I, and SW1 is a driving switch corresponding to the light-emitting unit group to which light-emitting data signals are to be first written in the current frame period II. TP denotes a vertical synchronization signal (VSYNC) triggered by the frequency modulation signal, i.e., a frequency modulation synchronization signal. A rising edge of the frequency modulation synchronization signal TP is in a turn-on phase of SW4, i.e., the writing phase of the light-emitting unit group to which light-emitting data signals are last written in the previous frame period I.

As can be seen in FIG. 2, at a time point at which the rising edge of the frequency modulation synchronization signal TP appears, SW4 and SW1 are turned on simultaneously. That is, light-emitting data signals provided by the driving module will be simultaneously written to the two light-emitting unit groups corresponding to SW4 and SW1, respectively, resulting in the problem of mischarging of the light-emitting data signal, which causes an abnormal brightness of the backlight and reduces the display effect of the display apparatus.

Figure 3:
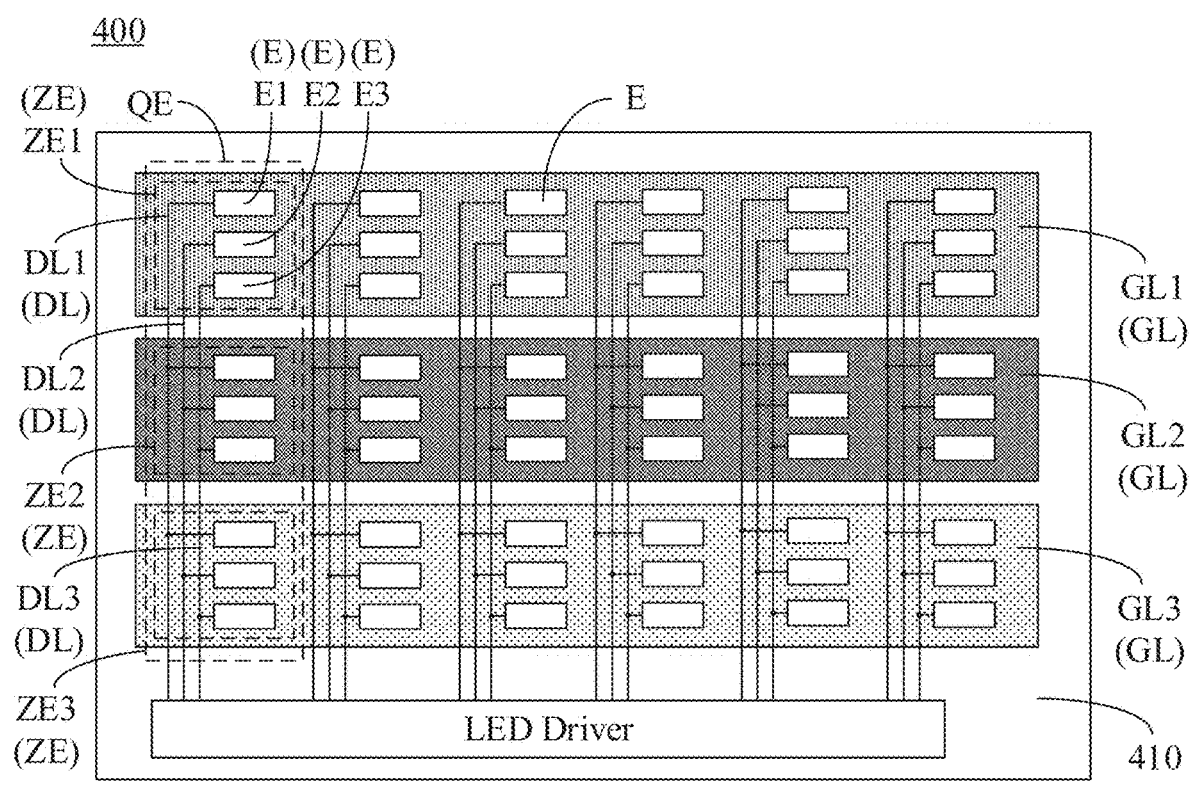
FIG. 3 is a structural diagram of a light-emitting substrate, in accordance with some embodiments.

In light of this, some embodiments of the present disclosure provide a driving method for a light-emitting substrate. As shown in FIG. 3, the light-emitting substrate 400 includes at least one light-emitting unit cluster QE, and N light-emitting unit groups ZE in a light-emitting unit cluster QE are electrically connected to N first signal lines GL, respectively; M light-emitting units E in a light-emitting unit group ZE are electrically connected to M second signal lines DL, respectively; and the N light-emitting unit groups ZE in the same light-emitting unit cluster QE are connected to the same M second signal lines DL, where N and M are both positive integers.

Within a frame period, the N first signal lines GL provide driving signals to the N light-emitting unit groups ZE in time-division to cause the N light-emitting unit groups ZE to be in a writing phase in time-division; and within a writing phase of a light-emitting unit group ZE, the M second signal lines DL provide light-emitting data signals to the M light-emitting units E in this light-emitting unit group ZE, simultaneously.

As shown in FIG. 3, the above-described light-emitting substrate 400 may include a substrate 410 and the at least one light-emitting unit cluster QE formed on the substrate 410. A light-emitting unit cluster QE may include N light-emitting unit groups ZE, and different light-emitting unit groups ZE are connected to different first signal lines GL, respectively. The N first signal lines GL provide driving signals in time-division, so that the N light-emitting unit groups ZE are in a writing phase in time-division. Specifically, in a case where the first signal line GL1 provides a driving signal and the other first signal lines GL (e.g., GL2 and GL3) provide no driving signal, the light-emitting unit group ZE1 is in the writing phase, and the other light-emitting unit groups ZE (e.g., ZE2 and ZE3) are not in the writing phase.

A light-emitting unit group ZE may include M light-emitting units E, and different light-emitting units E are connected to different second signal lines DL, respectively. In a case where a light-emitting unit group ZE is in a writing phase, the M second signal lines DL electrically connected to this light-emitting unit group ZE provide light-emitting data signals to the M light-emitting units E of this light-emitting unit group ZE, simultaneously. Specifically, in a case where the light-emitting unit group ZE1 is in the writing phase, the second signal line DL1 provides a light-emitting data signal to the light-emitting unit E1, and simultaneously the second signal line DL2 provides a light-emitting data signal to the light-emitting unit E2, and simultaneously the second signal line DL3 provides a light-emitting data signal to the light-emitting unit E3.

It will be noted that light-emitting data signals provided by the M second signal lines DL may be different, i.e., the M second signal lines can provide these light-emitting data signals independently of each other, so as to be able to realize independent control of each light-emitting unit E.

Figure 4A:
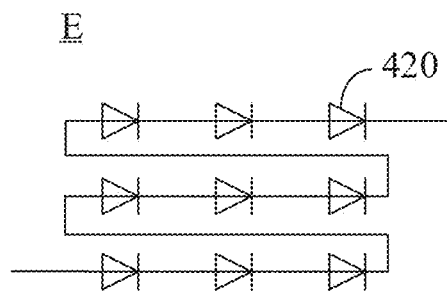
FIG. 4A is a structural diagram of a light-emitting unit group, in accordance with some embodiments.
Figure 4B:
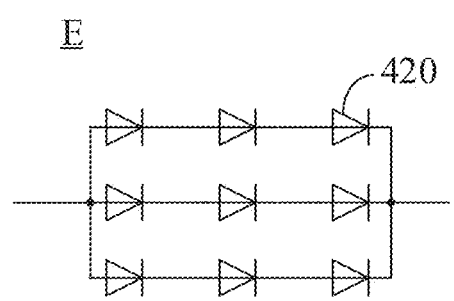
FIG. 4B is a structural diagram of another light-emitting unit group, in accordance with some embodiments.

A light-emitting unit E may include multiple light-emitting elements (such as Mini LEDs and/or Micro LEDs) 420. For example, multiple light-emitting elements 420 in a light-emitting unit E may have a connection structure of "one-parallel-multi-series" or "multi-parallel-multi-series". Here, the structure of "one-parallel-multi-series" may be understood as that all of the light-emitting elements in a light-emitting unit E are connected in series, as shown in FIG. 4A. Correspondingly, the structure of "multi-series-multi-parallel" may be understood as that a light-emitting unit E includes at least two light-emitting element strings, with at least one light-emitting element string including at least two light-emitting elements connected in series; and all of the light-emitting element strings in this light-emitting unit E are in parallel relationship with each other, as shown in FIG. 4B.

Multiple light-emitting elements 420 in a light-emitting unit E may be arranged in a rectangular shape, a rhombic shape, or the like, which is not limited herein. In addition, the number of light-emitting elements 420 in a light-emitting unit E is not limited to 3 as described above, but may be 8, 16, or the like, which is not limited herein. Correspondingly, the number of the second signal lines DL may also be 8, 16, or the like, which is not limited herein.

A light-emitting unit E includes two signal terminals, and the two signal terminal are electrically connected to a first signal line GL and a second signal line DL, respectively. In a case where the two signal terminals respectively receive a driving signal provided by the first signal line GL and a light-emitting data signal provided by the second signal line DL, multiple light-emitting elements 420 in the light-emitting unit E realize light emission. The luminous brightness of each light-emitting element 420 depends on the driving signal and the light-emitting data signal. Since all of the light-emitting elements 420 in a light-emitting unit E have the same driving signal and the same light-emitting data signal, all of the light-emitting elements 420 in a light-emitting unit E have the same luminous brightness.

Understandably, in a case where a light-emitting element 420 is an LED, a driving signal may be an anode signal and a light-emitting data signal may be a cathode signal, or the driving signal may be a cathode signal and the light-emitting data signal may be an anode signal. Since the second signal lines DL are capable of providing different signals to realize that different light-emitting units of the same light-emitting unit group emit light of different brightness, the signals provided by the second signal lines DL are referred to as light-emitting data signals.

Updating of the light-emitting data signals is performed on all of the light-emitting units E in the entire light-emitting substrate 400 for at least once, thereby realizing the refreshment of the backlight brightness of the light-emitting substrate 400.

The scan control module 110 relies primarily on the vertical synchronization signal (VSYNC) provided by the timing control circuit 220 to determine the current frame rate of the display apparatus.

Figure 5:
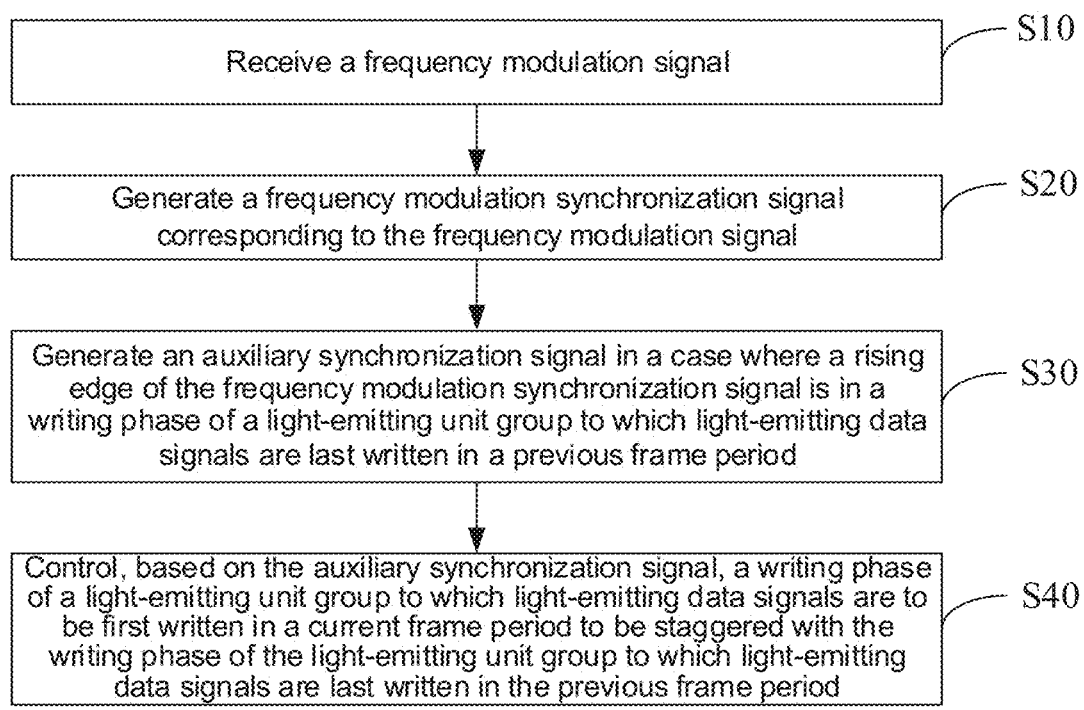
FIG. 5 is a flowchart of a driving method for a light-emitting substrate, in accordance with some embodiments.

In conjunction with FIG. 5, the above-described driving method for the light-emitting substrate includes steps S10 to S40.

In step S10, a frequency modulation signal is received.

The frequency modulation signal may be provided by a frequency modulation circuit external to the display apparatus, or may be generated and provided internally by the display apparatus under the control of other signals, which is not limited here.

The Frequency modulation signal may be a single signal or a signal composed of multiple signals. In some examples, the frequency modulation signal may include a start signal (Blanking Start, BS) of an interval period between two adjacent frames and an end signal (Blanking End, BE) of the interval period. A frame rate corresponding to the frequency modulation signal can be determined through the BS and BE signals. In some other examples, the Frequency modulation signal may also include other signals that capable of being used to determine the frame rate, which is not limited here.

The way of receiving the above-mentioned frequency modulation signal may be that: the light-emitting substrate is electrically connected to a device (e.g., module or circuit) providing the frequency modulation signal, and receives the frequency modulation signal through connecting wiring; or may be that the light-emitting substrate receives the frequency modulation signal through a wireless receiver by means of wireless signal transmission (e.g., Bluetooth, Wi-Fi, etc.); or may also be any other way capable of transmitting signals, which is not limited here.

In addition, since the frequency modulation signal may be provided randomly, a time point at which the frequency modulation signal is received may also be random. The time point at which the frequency modulation signal is received may be an arbitrary time point in a frame period.

In step S20, a frequency modulation synchronization signal corresponding to the frequency modulation signal is generated.

The frequency modulation synchronization signal TP corresponding to the frequency modulation signal may mean that a frame rate corresponding to the frequency modulation synchronization signal TP is the same as a frame rate corresponding to the frequency modulation signal. The above-described frequency modulation synchronization signal TP is one type of vertical synchronization signal (VSYNC). The frame rate corresponding to the frequency modulation synchronization signal TP is different from the frame rate corresponding to a vertical synchronization signal of the previous frame.

The frequency modulation synchronization signal TP may be generated by the timing control circuit 220 based on the frequency modulation signal. In some examples, the timing control circuit 220 resolves a data enable (DE) signal based on the BS and BE signals, and generates the frequency modulation synchronization signal TP based on the DE signal. In some other examples, the frequency modulation synchronization signal TP may also be generated by other means, which is not limited herein.

In some embodiments, the frequency modulation synchronization signal TP may be generated immediately upon reception of the frequency modulation signal. And again due to the randomness of the time point at which the frequency modulation signal is received, the time point at which the frequency modulation synchronization signal TP is generated is also random, resulting in that the time point at which the frequency modulation synchronization signal TP is generated may be an arbitrary time point in a frame period.

Understandably, the frequency modulation synchronization signal TP is one type of vertical synchronization signal, generated randomly by frequency modulation signal triggering, and is different from other vertical synchronization signals that appear in accordance with fixed intervals of the frame period.

Also, since the frequency modulation synchronization signal TP is one type of vertical synchronization signal, the generation of the frequency modulation synchronization signal TP will cause the previous frame period I to be interrupted at any time. Thus, a duration of the previous frame period I will be less than or equal to an original duration of the previous frame period I. In a case where the duration of the previous frame period I is less than the original duration of the previous frame period I, the rising edge of the frequency modulation synchronization signal TP may be in the writing phase of a certain light-emitting unit group ZE, or it may be in a gap originally between the writing phases of two light-emitting unit groups ZE.

It will be noted that the frame rate corresponding to the frequency modulation signal does not affect a time point at which the frequency modulation synchronization signal TP is generated. That is, regardless of whether the frequency modulation signal raises the original frame rate or lowers the original frame rate, the frequency modulation signal does not affect the duration of the previous frame period I. The duration of the previous frame period I may be less than a duration of the current frame period II or greater than the duration of the current frame period II.

In step S30, an auxiliary synchronization signal (RESYNC) is generated in a case where the rising edge of the frequency modulation synchronization signal is in a writing phase of a light-emitting unit group to which light-emitting data signals are last written in the previous frame period I.

The time point at which the rising edge of the vertical synchronization signal occurs is a dividing time point between two adjacent frames under the conventional definition. Due to the appearance of the rising edge of the frequency modulation synchronization signal TP, the previous frame period I ends and the current frame period II starts.

The auxiliary synchronization signal may be generated by the timing control circuit 220 or may be generated by the driving control circuit 20, which is not limited herein.

The rising edge of the auxiliary synchronization signal may be located after the rising edge of the frequency modulation synchronization signal TP. A signal duration of the auxiliary synchronization signal may be the same as a signal duration of the frequency modulation synchronization signal TP, or may be different from the signal duration of the frequency modulation synchronization signal TP. Here, the signal duration of the auxiliary synchronization signal may be in a range of 10 μs to 20 μs, inclusive, for example, 10 μs, 11.6 μs, 12.9 μs, 13.4 μs, 14 μs, 15.5 μs, 16.1 μs, 17.8 μs, 19.2 μs, or 20 μs.

It can be understood that the auxiliary synchronization signal is a signal that is generated based on the vertical synchronization signal. Specifically, the auxiliary synchronization signal is generated when the rising edge of the vertical synchronization signal (including the frequency modulation synchronization signal TP) is in the writing phase of any one light-emitting unit group ZE, with the rising edge of the auxiliary synchronization signal lagging behind the rising edge of the vertical synchronization signal. The auxiliary synchronization signal is not a vertical synchronization signal, but has the same effect as the vertical synchronization signal.

In step S40, a writing phase of a light-emitting unit group ZE to which light-emitting data signals are to be first written in the current frame period II is controlled, based on the auxiliary synchronization signal, to be staggered with the writing phase of the light-emitting unit group ZE to which light-emitting data signals are last written in the previous frame period I.

Here, the light-emitting unit group ZE to which light-emitting data signals are last written in the previous frame period I belongs to the same light-emitting unit cluster QE as the light-emitting unit group ZE to which light-emitting data signals are to be first written in the current frame period II.

The writing phase of the light-emitting unit group ZE to which light-emitting data signals are to be first written in the current frame period II is staggered with the writing phase of the light-emitting unit group ZE to which light-emitting data signals are last written in the previous frame period I, which means that a time period of the writing phase of the light-emitting unit group ZE to which light-emitting data signals are to be first written in the current frame period II is non-overlapping with a time period of the writing phase of the light-emitting unit group ZE to which light-emitting data signals are last written in the previous frame period I.

The writing phase of the light-emitting unit group ZE to which light-emitting data signals are last written in the previous frame period I has already started when the rising edge of the frequency modulation synchronization signal TP appears. That is, the writing phase of the light-emitting unit group ZE to which light-emitting data signals are last written in the previous frame period I is earlier than the writing phase of the light-emitting unit group ZE to which light-emitting data signals are to be first written in the current frame period II. Therefore, after the completion of the writing phase of the light-emitting unit group ZE to which light-emitting data signals are last written in the previous frame period I, the writing phase of the light-emitting unit group ZE to which light-emitting data signals are to be first written in the current frame period II starts.

Figure 6A:
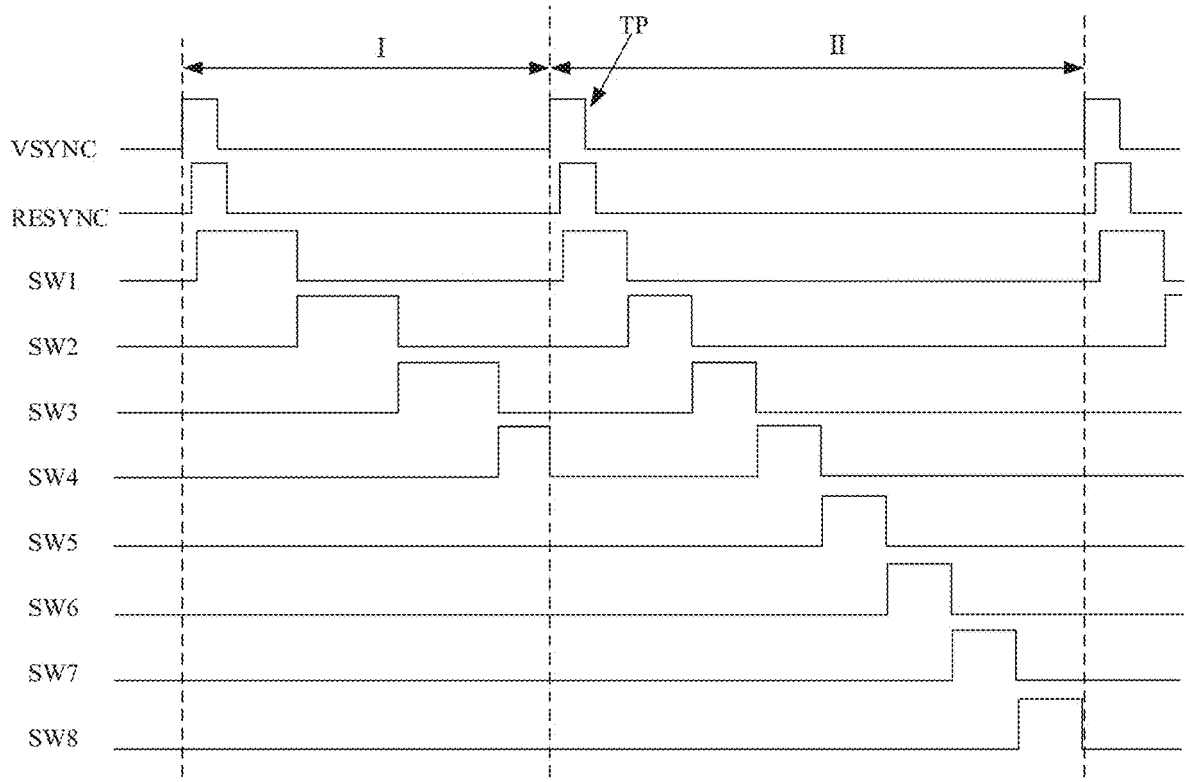
FIG. 6A is a timing diagram of driving signals of a light-emitting unit cluster, in accordance with some embodiments.

In some examples, the writing phase of the light-emitting unit group ZE to which light-emitting data signals are last written in the previous frame period I may end when the rising edge of the frequency modulation synchronization signal TP appears, as shown in FIG. 6A (only TP in FIG. 6A is a frequency modulation synchronization signal, the rest VSYNC in FIG. 6A is not frequency modulation synchronization signal). That is, only some of the light-emitting data signals are written to the light-emitting unit group ZE to which light-emitting data signals are last written in the previous frame period I. In these examples, the fourth light-emitting unit group serves as the light-emitting unit group ZE to which light-emitting data signals are last written in the previous frame period I, which corresponds to the driving switch SW4 in FIG. 6A; and the first light-emitting unit group serves as the light-emitting unit group ZE to which light-emitting data signals are to be first written in the current frame period II, which corresponds to the driving switch SW1 in FIG. 6A.

In a case where the writing phase of the light-emitting unit group ZE to which light-emitting data signals are last written in the previous frame period I ends when the rising edge of the frequency modulation synchronization signal TP appears, the auxiliary synchronization signal (RESYNC) controls that the writing phase of the light-emitting unit group ZE to which light-emitting data signals are to be first written in the current frame period II may start when the rising edge of the frequency modulation synchronization signal TP appears, as shown in FIG. 6A.

Figure 6B:
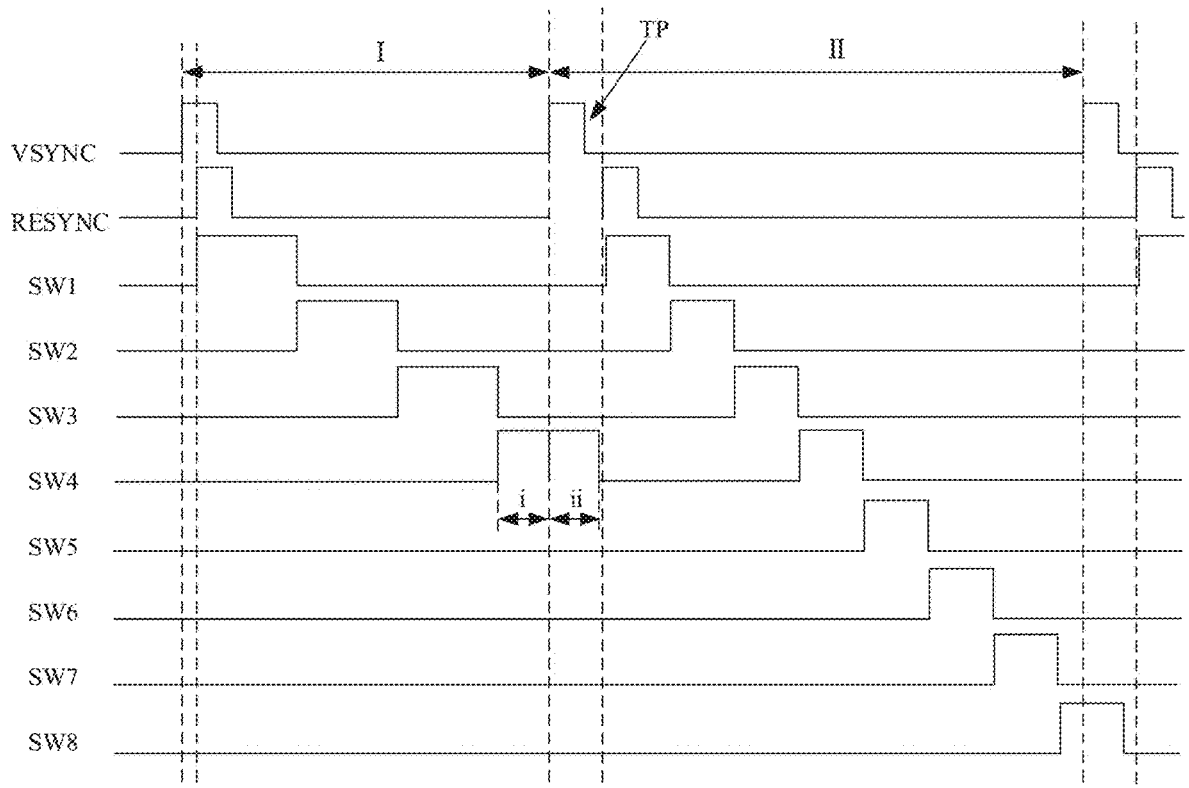
FIG. 6B is another timing diagram of driving signals of a light-emitting unit cluster, in accordance with some embodiments.

In some other examples, the writing phase of the light-emitting unit group ZE to which light-emitting data signals are last written in the previous frame period I may also end after the rising edge of the frequency modulation synchronization signal TP appears, as shown in FIG. 6B (only TP in FIG. 6B is a frequency modulation synchronization signal, the rest VSYNC in FIG. 6B is not frequency modulation synchronization signal). That is, the total of the light-emitting data signals is written to the light-emitting unit group ZE to which light-emitting data signals are last written in the previous frame period I.

In a case where the writing phase of the light-emitting unit group ZE to which light-emitting data signals are last written in the previous frame period I ends after the rising edge of the frequency modulation synchronization signal TP appears, the auxiliary synchronization signal (RESYNC) controls that the writing phase of the light-emitting unit group ZE to which light-emitting data signals are to be first written in the current frame period II needs to start some time after the rising edge of the frequency modulation synchronization signal TP appears, as shown in FIG. 6B.

It will be noted that VSYNC in the accompanying drawings of the present disclosure is the vertical synchronization signal (including the frequency modulation synchronization signal TP), and RESYNC in the accompanying drawings is the auxiliary synchronization signal.

The light-emitting unit group ZE to which light-emitting data signals are last written in the previous frame period I belongs to the same light-emitting unit cluster QE as the light-emitting unit group ZE to which light-emitting data signals are to be first written in the current frame period II, both of which are connected to the same multiple second Signal lines DL. By controlling the writing phase of the light-emitting unit group ZE to which light-emitting data signals are to be first written in the current frame period II to be staggered with the writing phase of the light-emitting unit group ZE to which light-emitting data signals are last written in the previous frame period I, the backlight abnormality caused by the mischarging of the light-emitting data signals may be avoided, improving the display effect of the display apparatus.

To sum up, in the driving method for the light-emitting substrate that is provided by the present disclosure, the auxiliary synchronization signal is generated in the case where the rising edge of the frequency modulation synchronization signal TP is in the writing phase of the light-emitting unit group to which light-emitting data signals are last written in the previous frame period I. In this way, the writing phase of the light-emitting unit group ZE to which light-emitting data signals are to be first written in the current frame period II is staggered with the writing phase of the light-emitting unit group ZE to which light-emitting data signals are last written in the previous frame period I, thereby avoiding the backlight abnormality caused by the mischarging of the light-emitting data signals, and improving the display effect of the display apparatus.

Figure 7:
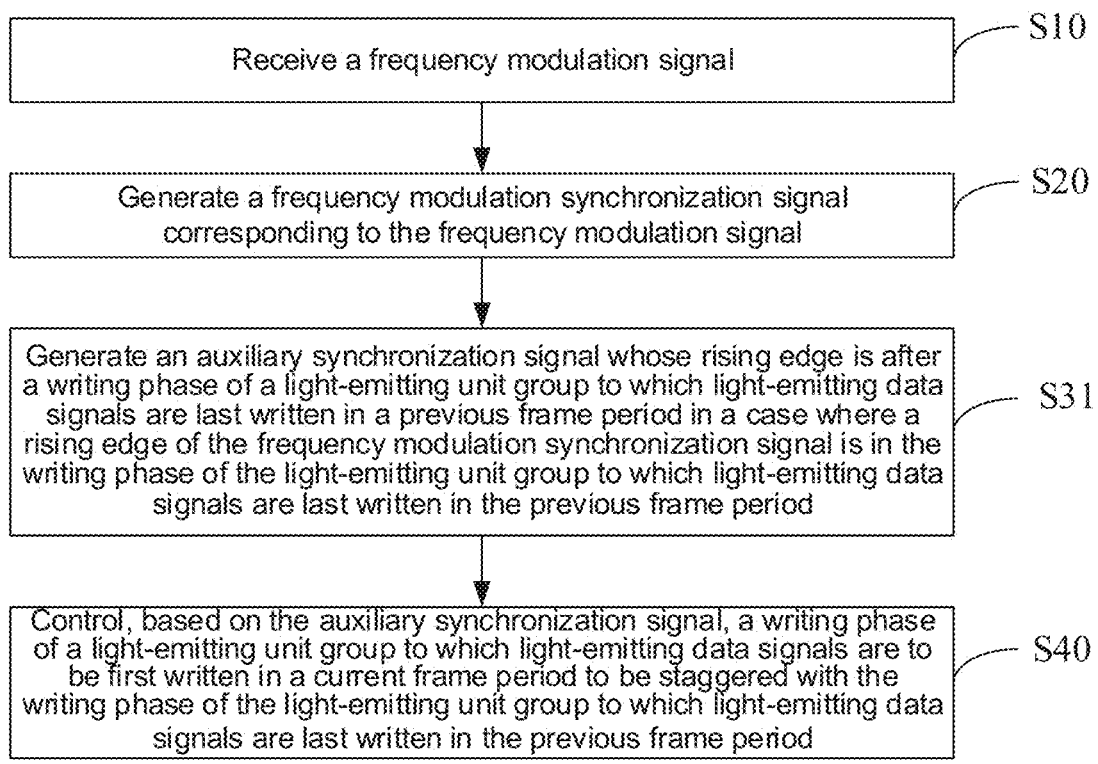
FIG. 7 is a flowchart of another driving method for a light-emitting substrate, in accordance with some embodiments.

In conjunction with FIG. 7, in some embodiments, step S30 in which the auxiliary synchronization signal is generated includes step S31 in which the auxiliary synchronization signal whose rising edge is after the writing phase of the light-emitting unit group ZE to which light-emitting data signals are last written in the previous frame period I is generated.

In these embodiments, the auxiliary synchronization signal replaces the frequency modulation synchronization signal, so as to control the function of starting the writing of the light-emitting unit group ZE to which light-emitting data signals are to be first written in the current frame period II.

The rising edge of the auxiliary synchronization signal is after the writing phase of the light-emitting unit group ZE to which light-emitting data signals are last written in the previous frame period I, so that the writing phase of the light-emitting unit group ZE to which light-emitting data signals are last written in the previous frame period I may include a first writing stage i and a second writing stage ii which are consecutive. The first writing stage i is located before the rising edge of the frequency modulation synchronization signal TP, and the second writing stage ii is located after the rising edge of the frequency modulation synchronization signal TP, as shown in FIG. 6B.

After the writing phase of the light-emitting unit group ZE to which light-emitting data signals are last written in the previous frame period I is completed, the auxiliary synchronization signal (RESYNC) triggers the rising edge to control the light-emitting unit group ZE to which light-emitting data signals are to be first written in the current frame period II to start writing, thus realizing that the writing phase of the light-emitting unit group ZE to which light-emitting data signals are to be first written in the current frame period II is staggered with the writing phase of the light-emitting unit group ZE to which light-emitting data signals are last written in the previous frame period I.

In addition, in some embodiments, in the case where the rising edge of the frequency modulation synchronization signal TP is in the writing phase of the light-emitting unit group ZE to which light-emitting data signals are last written in the previous frame period I, the writing of the light-emitting unit group ZE to which light-emitting data signals are last written in the previous frame period I will be interrupted, causing an abnormal light emission of the light-emitting unit group ZE to which light-emitting data signals are last written in the previous frame period I.

In these embodiments, the rising edge of the auxiliary synchronization signal (RESYNC) is located after the writing phase of the light-emitting unit group ZE to which light-emitting data signals are last written in the previous frame period I, so that the total of the light-emitting data signals can be written to the light-emitting unit group ZE to which light-emitting data signals are last written in the previous frame period I, so as to avoid the problem of the abnormal light emission of the light-emitting unit group ZE to which light-emitting data signals are last written in the previous frame period I.

Figure 8:
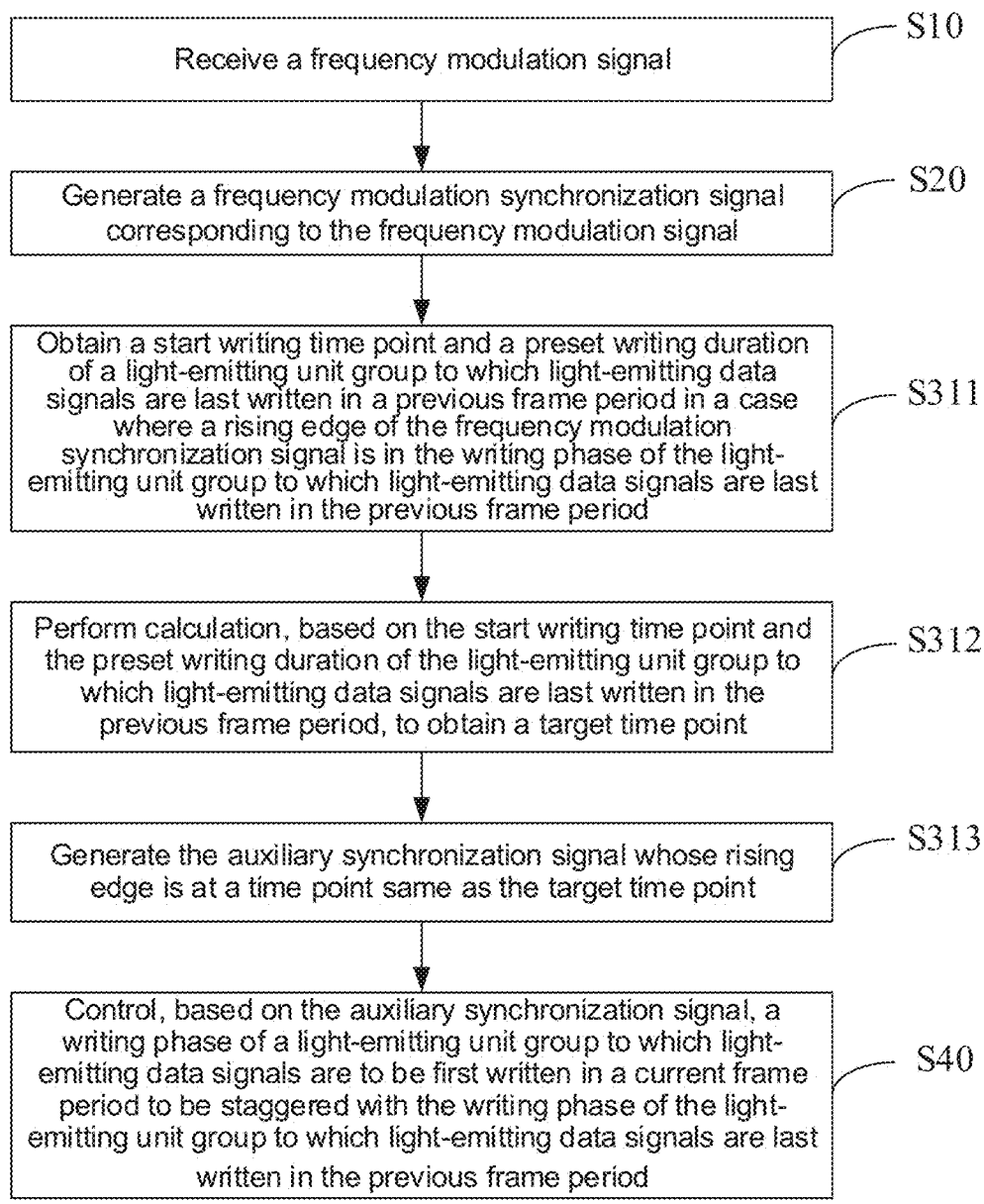
FIG. 8 is a flowchart of yet another driving method for a light-emitting substrate, in accordance with some embodiments.

In conjunction with FIG. 8, in some embodiments, step S31 includes steps S311 to S313.

In step S311, a start writing time point and a preset writing duration of the light-emitting unit group ZE to which light-emitting data signals are last written in the previous frame period I are obtained.

The start writing time point of the light-emitting unit group ZE to which light-emitting data signals are last written in the previous frame period I may be a time point at which the scan control module 110 starts to provide a driving signal via a first signal line GL to the light-emitting data signals are last written in the previous frame period I.

In some examples, an interval duration between writing phases of two adjacent light-emitting unit groups ZE in a light-emitting unit cluster QE is set in advance by the scan control module 110. Therefore, the start writing time point of the light-emitting unit group ZE to which light-emitting data signals are last written in the previous frame period I may also be obtained by calculating an end writing time point of a writing phase of a light-emitting unit group ZE to which light-emitting data signals are penultimately written in the previous frame period I and the interval duration.

The preset writing duration of the light-emitting unit group ZE to which light-emitting data signals are last written in the previous frame period I may be an equal writing duration pre-distributed by the scan control module 110 to each light-emitting unit group ZE in a light-emitting unit cluster QE in the previous frame period I.

In some examples, a writing duration of each light-emitting unit group ZE in a light-emitting unit cluster QE is set in advance by the scan control module 110, with the writing duration of each light-emitting unit group ZE being substantially consistent. Therefore, a writing duration of another light-emitting unit group ZE to which light-emitting data signals have been written in the previous frame period I may also serve as the preset writing duration of the light-emitting unit group ZE to which light-emitting data signals are last written in the previous frame period I.

Of course, the above method may also include other manners capable of determining or obtaining by calculation the start writing time point and the preset writing duration of the light-emitting unit group ZE to which light-emitting data signals are last written in the previous frame period I, and the foregoing is only an example and should not be regarded as a limitation.

In step S312, calculation is performed, based on the start writing time point and the preset writing duration of the light-emitting unit group ZE to which light-emitting data signals are last written in the previous frame period I, to obtain a target time point, where a time interval between the target time point and the start writing time point of the light-emitting unit group ZE to which light-emitting data signals are last written in the previous frame period I is greater than the preset writing duration.

The time interval between the target time point and the start writing time point of the light-emitting unit group ZE to which light-emitting data signals are last written in the previous frame period I is greater than the preset writing duration of the light-emitting unit group ZE to which light-emitting data signals are last written in the previous frame period I. That is, the target time point is located after the writing phase of the light-emitting unit group ZE to which light-emitting data signals are last written in the previous frame period I.

The time interval between the target time point and the start writing time point of the light-emitting unit group ZE to which light-emitting data signals are last written in the previous frame period I, may be equal to the sum of the preset writing duration of the light-emitting unit group ZE to which light-emitting data signals are last written in the previous frame period I and a preset interval duration between writing phases of two adjacent light-emitting unit groups ZE.

The preset interval duration between writing phases of two adjacent light-emitting unit groups ZE may be an interval duration between writing phases of two adjacent light-emitting unit groups ZE that is preset by the scan control module 110 corresponding to the previous frame period I, or may be an interval duration between writing phases of two adjacent light-emitting unit groups ZE that is preset by the scan control module 110 corresponding to the current frame period II.

Here, in a case where the duration of the current frame period II is greater than the duration of the previous frame period I, the interval duration between the writing phases of two adjacent light-emitting unit groups ZE that is preset by the scan control module 110 corresponding to the current frame period II, is greater than the interval duration between the writing phases of two adjacent light-emitting unit groups ZE that is preset by the scan control module 110 corresponding to the previous frame period I. In a case where the duration of the current frame period II is less than the duration of the previous frame period I, the interval duration between the writing phases of two adjacent light-emitting unit groups ZE that is preset by the scan control module 110 corresponding to the current frame period II, is less than the interval duration between the writing phases of two adjacent light-emitting unit groups ZE that is preset by the scan control module 110 corresponding to the previous frame period I.

Of course, the time interval between the target time point and the start writing time point of the light-emitting unit group ZE to which light-emitting data signals are last written in the previous frame period I, may also be greater or less than the sum of the preset writing duration of the light-emitting unit group ZE to which light-emitting data signals are last written in the previous frame period I and the preset interval duration between the writing phases of two adjacent light-emitting unit groups ZE.

In step S313, the auxiliary synchronization signal (RESYNC) whose rising edge is at a time point same as the target time point is generated.

Since the target time point is after the writing phase of the light-emitting unit group ZE to which light-emitting data signals are last written in the previous frame period I, it is possible to make the rising edge of the auxiliary synchronization signal (RESYNC) after the writing phase of the light-emitting unit group ZE to which light-emitting data signals are last written in the previous frame period I, and then to make the auxiliary synchronization signal (RESYNC) control the writing phase of the light-emitting unit group ZE to which light-emitting data signals are to be first written in the current frame period II to be after the writing phase of the light-emitting unit group ZE to which light-emitting data signals are last written in the previous frame period I.

In a case where the time interval between the target time point and the start writing time point of the light-emitting unit group ZE to which light-emitting data signals are last written in the previous frame period I is equal to the sum of the preset writing duration of the light-emitting unit group ZE to which light-emitting data signals are last written in the previous frame period I and the preset interval duration between the writing phases of two adjacent light-emitting unit groups ZE, the continuity of sequential writing of the light-emitting unit groups ZE can be improved, and the smoothness of images displayed by the display apparatus can be improved.

Figure 9:
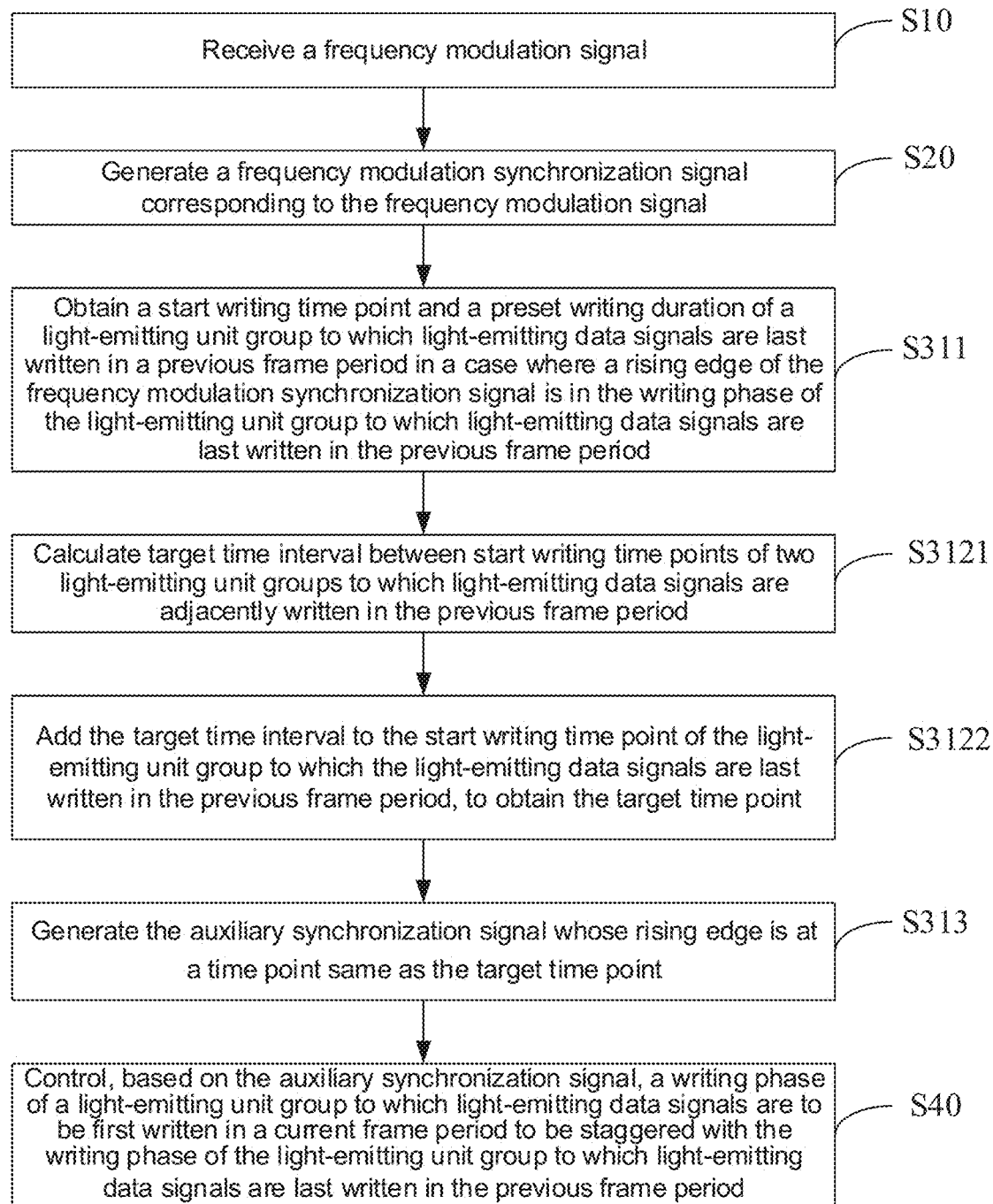
FIG. 9 is a flowchart of still another driving method for a light-emitting substrate, in accordance with some embodiments.

As shown in FIG. 9, in some embodiments, step S312 includes steps S3121 and S3122.

In step S3121, a target time interval between start writing time points of two light-emitting unit groups ZE to which light-emitting data signals are adjacently written in the previous frame period I is calculated.

In step S3122, the target time interval is added to the start writing time point of the light-emitting unit group ZE to which light-emitting data signals are last written in the previous frame period I, to obtain the target time point.

The target time interval between start writing time points of two light-emitting unit groups ZE to which light-emitting data signals are adjacently written in the previous frame period I may be obtained by such way of a time point at which the scan control module 110 controls a light-emitting unit group ZE with a post-writing order of the two light-emitting unit groups ZE to which light-emitting data signals have been adjacently written to start the writing phase, minus a time point at which a light-emitting unit group ZE with a prior-writing order of the two light-emitting unit groups ZE to which light-emitting data signals are adjacently written to start the writing phase.

The time interval between the target time point and the start writing time point of the light-emitting unit group ZE to which light-emitting data signals are last written in the previous frame period I is equal to the target time interval between the start writing time points of the two light-emitting unit groups ZE to which light-emitting data signals are adjacently written in the previous frame period I, so that the light-emitting unit group ZE to which light-emitting data signals are to be first written in the current frame period II that is subsequently controlled by the rising edge of the auxiliary synchronization signal starts the writing phase at the target time point.

That is, a time interval between the writing phase of the light-emitting unit group ZE to which light-emitting data signals are to be first written in the current frame period II and the writing phase of the light-emitting unit group ZE to which light-emitting data signals are last written in the previous frame period I, is equal to the time interval between the writing phases of the two light-emitting unit groups ZE to which light-emitting data signals are adjacently written in the previous frame period I.

In this way, in a case where the display apparatus receives a frequency modulation signal, a time interval between writing phases of light-emitting unit groups ZE to which light-emitting data signals are continuously written remains stable, ensuring the smoothness of images displayed by the display apparatus.

Figure 10:
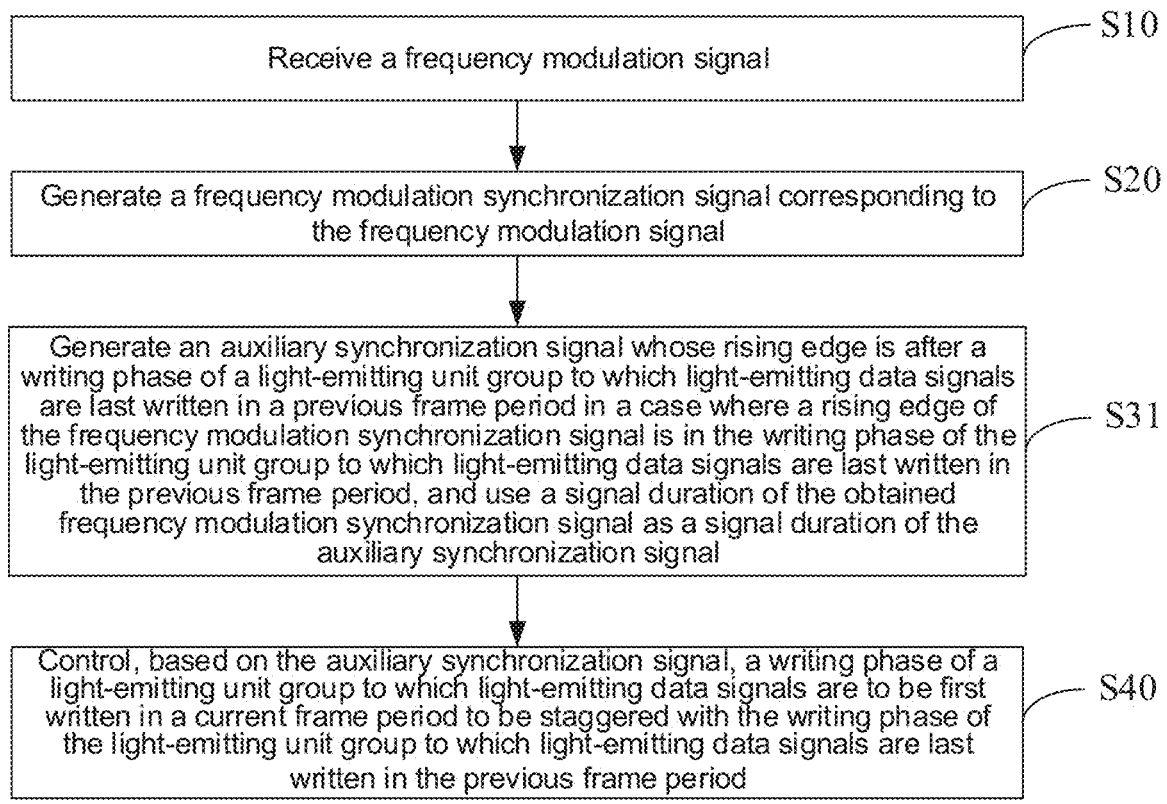
FIG. 10 is a flowchart of still yet another driving method for a light-emitting substrate, in accordance with some embodiments.

As shown in FIG. 10, in some embodiments, step S31 further includes using a signal duration of the obtained frequency modulation synchronization signal TP as a signal duration of the auxiliary synchronization signal (RESYNC).

The above-mentioned frequency modulation synchronization signal TP is one type of vertical synchronization signal. A signal duration of the vertical synchronization signal may be fixed, i.e., the signal duration of the frequency modulation synchronization signal TP is the same as signal durations of other vertical synchronization signals. In this case, the signal duration of the frequency modulation synchronization signal TP may be obtained by obtaining a signal duration of any one vertical synchronization signal.

The vertical synchronization signal may also have different signal durations in a variety of cases. For example, under the control of the frequency modulation signal, were the signal duration of the frequency modulation synchronization signal TP is different from the signal durations of other vertical synchronization signals, and is not limited herein.

The frequency modulation synchronization signal TP may be generated by the timing control circuit 220 based on the frequency modulation signal. The signal duration of the frequency modulation synchronization signal TP may be obtained by the timing control circuit 220.

The signal duration of the frequency modulation synchronization signal TP is used as the signal duration of the auxiliary synchronization signal (RESYNC), so that the auxiliary synchronization signal (RESYNC) is equivalent to a frequency modulation synchronization signal TP that undergoes a delay, and this delay enables the writing phase of the light-emitting unit group ZE to which light-emitting data signals are last written in the previous frame period I to be completed smoothly.

Figure 11:
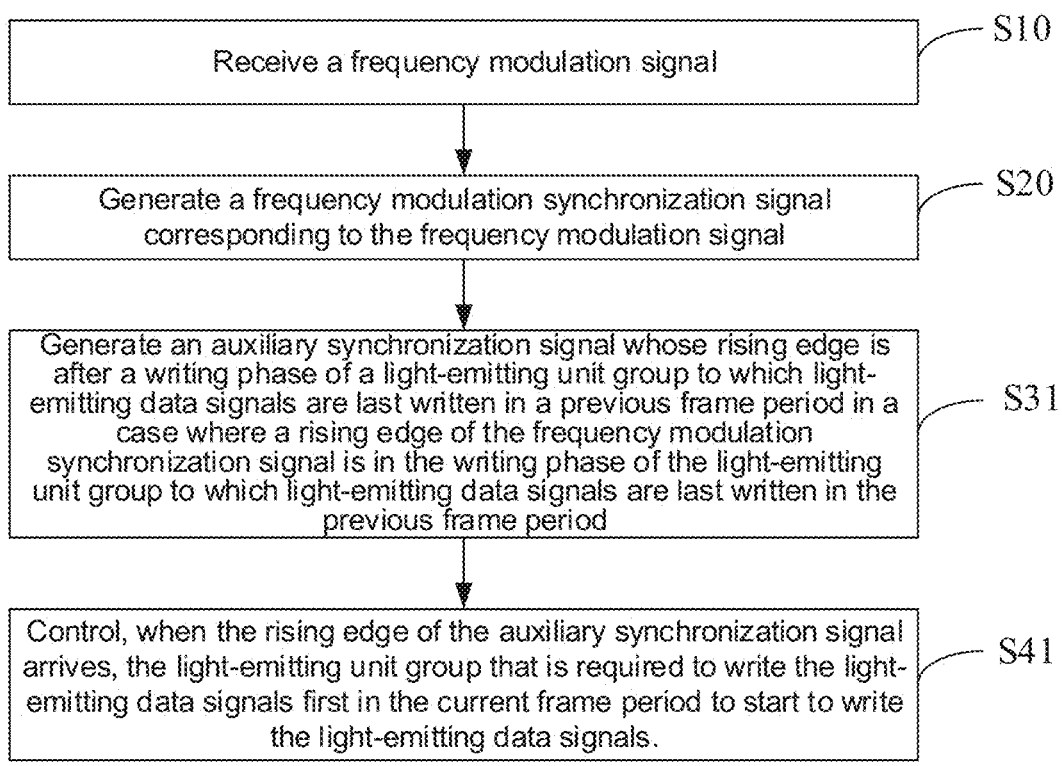
FIG. 11 is a flowchart of still yet another driving method for a light-emitting substrate, in accordance with some embodiments.

As shown in FIG. 11, in some embodiments, step S40 includes step S41.

In step S41, when the rising edge of the auxiliary synchronization signal (RESYNC) arrives, the light-emitting unit group ZE that is required to write light-emitting data signals first in the current frame period II is controlled to start writing the light-emitting data signals.

The scan control module 110 is capable of acquiring a generated auxiliary synchronization signal (RESYNC), and when a rising edge of the auxiliary synchronization signal (RESYNC) acquired by the scan control module 110 occurs, the scan control module 110 controls the light-emitting unit group ZE that is required to write light-emitting data signals first in the current frame period II to start writing the light-emitting data signals.

In some examples, an order of light-emitting unit groups ZE to which light-emitting data signals are written in each frame period is the same. That is, the light-emitting unit group ZE to which light-emitting data signals are to be first written in each frame period is the same. Even if some light-emitting unit groups ZE that are required to write light-emitting data signals in a former frame period in two adjacent frames do not write the light-emitting data signals, a light-emitting unit group ZE that is required to write light-emitting data signals first in a latter frame period is the same as a light-emitting unit group ZE to which light-emitting data signals are first written in the former frame period, as shown in FIGS. 6A and 6B.

A time point at which the rising edge of the auxiliary synchronization signal (RESYNC) appears is the same as a time point at which the light-emitting unit group ZE to which light-emitting data signals are to be first written in the current frame period II starts writing. It has been described above that the rising edge of the auxiliary synchronization signal (RESYNC) occurs after the writing phase of the light-emitting unit group ZE to which light-emitting data signals are last written in the previous frame period I. Therefore, it is possible to make the writing phase of the light-emitting unit group ZE to which light-emitting data signals are last written in the previous frame period I before the writing phase of the light-emitting unit group ZE to which light-emitting data signals are to be first written in the current frame period II, thereby avoiding the backlight abnormality caused by the mischarging of the light-emitting data signals, and improving the display effect of the display apparatus.

Figure 12:
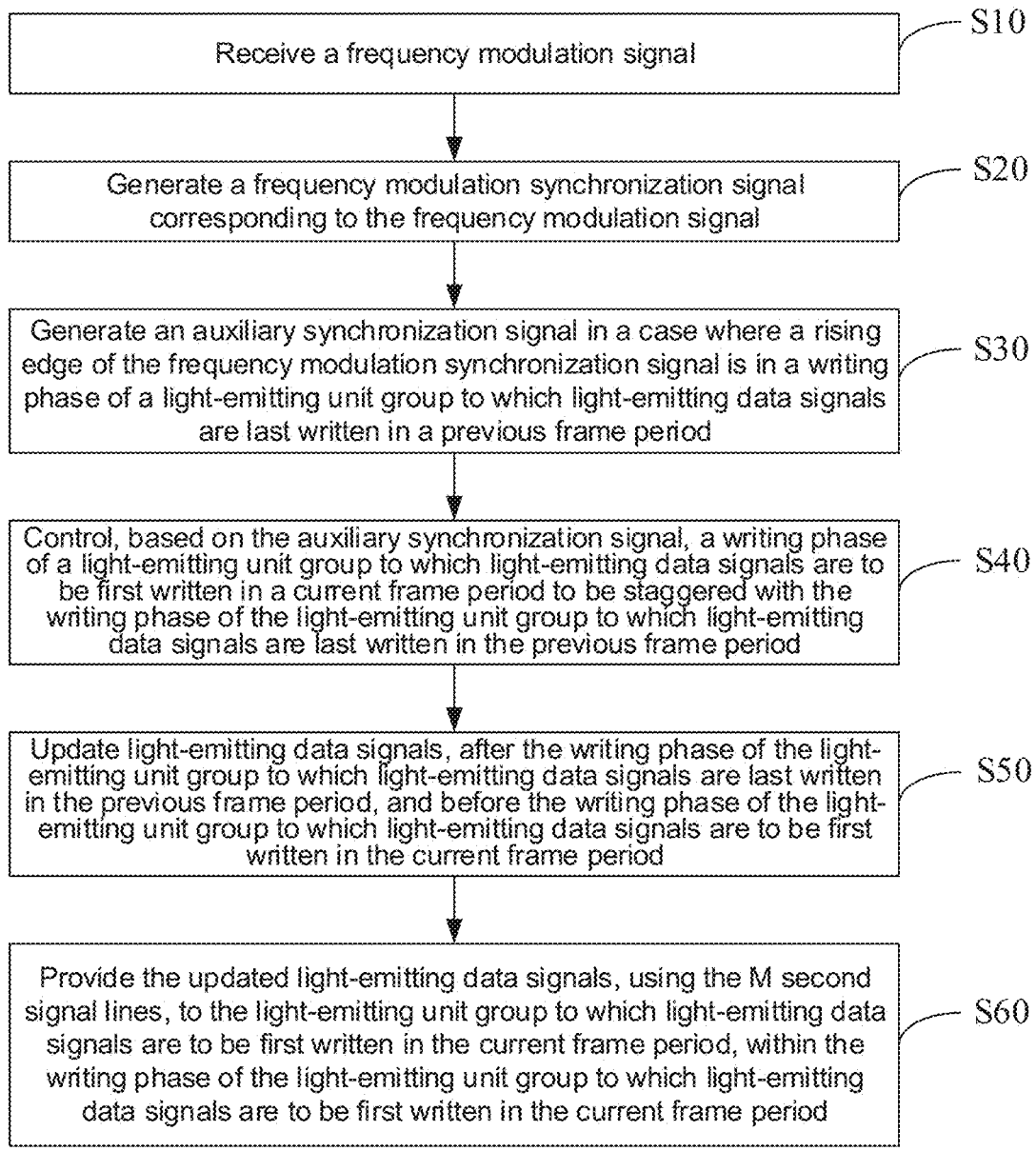
FIG. 12 is a flowchart of still yet another driving method for a light-emitting substrate, in accordance with some embodiments.

As shown in FIG. 12, in some embodiments, the above-described driving method for the light-emitting substrate further includes steps S50 and S60.

In step S50, light-emitting data signals are updated, after the writing phase of the light-emitting unit group ZE to which light-emitting data signals are last written in the previous frame period I, and before the writing phase of the light-emitting unit group ZE to which light-emitting data signals are to be first written in the current frame period II.

Light-emitting data signals are provided to each light-emitting unit group by the driving module 210, and the update of the light-emitting data signals may be an update of the light-emitting data signals by the driving module 210 based on the image data provided by the timing control signal. In a case where a time point at which the light-emitting data signals are updated is in a writing phase of a light-emitting unit group ZE, this will cause a problem of an abnormality in the writing of the light-emitting data signals of the light-emitting unit group ZE.

In some examples, the driving module 210 may receive an auxiliary synchronization signal (RESYNC) and update the light-emitting data signals (i.e., update the light-emitting data signals of the previous frame period I to the light-emitting data signals of the current frame period II) at a time point at which the rising edge of the auxiliary synchronization signal (RESYNC) appears. After an updating phase of the light-emitting data signals is completed, the light-emitting unit group ZE to which light-emitting data signals are to be first written in the current frame period II is controlled to start writing.

In some other examples, the driving module 210 may be connected to the scan control module 110 to update the light-emitting data signals after a time point at which the scan control module 110 controls the light-emitting unit group ZE to which light-emitting data signals are last written in the previous frame period I to end the writing. The updating phase for updating the light-emitting data signals may be before the time point at which the rising edge of the auxiliary synchronization signal (RESYNC) appears, or may include the time point at which the rising edge of the auxiliary synchronization signal (RESYNC) appears, or may be after the time point at which the rising edge of the auxiliary synchronization signal (RESYNC) appears. It is only necessary that the updating phase for updating the light-emitting data signals is before the start writing time point of the light-emitting unit group ZE to which light-emitting data signals are to be first written in the current frame period II.

In step S60, the updated light-emitting data signals are provided, using the M second signal lines DL, to the light-emitting unit group ZE to which light-emitting data signals are to be first written in the current frame period II, within the writing phase of the light-emitting unit group ZE to which light-emitting data signals are to be first written in the current frame period II.

The scan control module 110 controls the writing phase of the light-emitting unit group ZE to which light-emitting data signals are to be first written in the current frame period II to start, and the driving module 210 uses the M second signal lines DL to provide the updated light-emitting data signals to the light-emitting unit group ZE to which light-emitting data signals are to be first written in the current frame period II, so that the light-emitting unit group ZE to which light-emitting data signals are to be first written in the current frame period II can emit light subsequently based on the updated light-emitting data signals, thereby realizing the updating of current frame backlight of the display apparatus.

By controlling the driving module 210 to update, via the auxiliary synchronization signal (RESYNC), the light-emitting data signals after the writing phase of the light-emitting unit group ZE to which light-emitting data signals are last written in the previous frame period I, and before the writing phase of the light-emitting unit group ZE to which light-emitting data signals are to be first written in the current frame period II, the updating of the light-emitting data signals can be prevented from causing an abnormality in the writing of the light-emitting unit group ZE.

Figure 13:
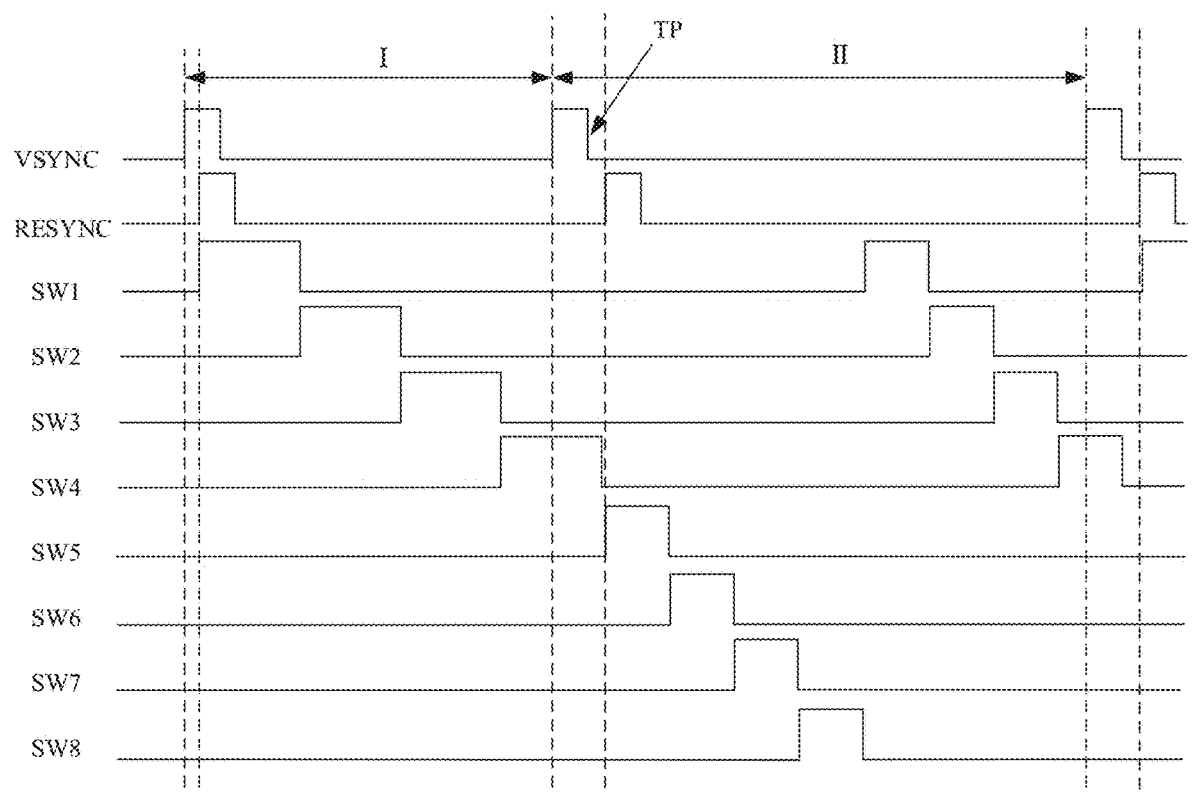
FIG. 13 is yet another timing diagram of driving signals of a light-emitting unit cluster, in accordance with some embodiments.

In some embodiments, as shown in FIG. 13, the light-emitting unit group ZE to which light-emitting data signals are to be first written in the current frame period II is a light-emitting unit group ZE next to the light-emitting unit group ZE to which light-emitting data signals are last written in a writing sequence of light-emitting unit groups corresponding to the previous frame period I.

In a case where the current frame period II is less than the previous frame period I, since the scan control module 110 is unable to instantaneously change the internal counting clock, this will cause some light-emitting unit groups ZE in a light-emitting unit cluster QE to reach the current frame period II before they have entered the writing phase in the previous frame period I.

In this case, if each frame period is sequentially entered into the writing phases in accordance with a preset writing order, as shown in FIG. 6B, a light-emitting unit group ZE that writes no light-emitting data signal in the previous frame period I will write light-emitting data signals once less than other light-emitting unit groups ZE, resulting in the problem of missing backlight refreshing.

In these embodiments, the light-emitting unit group ZE next to the light-emitting unit group ZE to which light-emitting data signals are last written in the previous frame period I is taken as the light-emitting unit group ZE to which light-emitting data signals are to be first written in the current frame period II, in accordance with the order of sequential writing of the light-emitting unit groups ZE in the previous frame period I. By way of example, SW1 to SW8 correspond to driving switches of the first light-emitting unit group to the eighth light-emitting unit group, respectively. An order in which the light-emitting unit groups ZE sequentially write light-emitting data signals in time-division in the previous frame period I is from SW1 to SW8. Therefore, in a case where the light-emitting unit group ZE to which light-emitting data signals are last written in the previous frame period I is the fourth light-emitting unit group, the light-emitting unit group ZE to which light-emitting data signals are to be first written in the current frame period II is the fifth light-emitting unit group; and light-emitting data signals are sequentially written in time-division until the eighth light-emitting unit group completes writing, and then the first light-emitting unit group starts writing light-emitting data signals.

In this way, the light-emitting unit group ZE that write no light-emitting data signal in the previous frame period I will still write light-emitting data signals in accordance with the order of sequential writing of the light-emitting unit groups ZE in the previous frame period I, and will not write the light-emitting data signals once less than other light-emitting unit groups ZE, so as to avoid the problem of missing backlight refreshing, and to improve the display effect of the display apparatus.

To sum up, in the driving method for the light-emitting substrate that is provided by the present disclosure, the auxiliary synchronization signal (RESYNC) is generated in the case where the rising edge of the frequency modulation synchronization signal TP is in the writing phase of the light-emitting unit group ZE to which light-emitting data signals are last written in the previous frame period I. In this way, the writing phase of the light-emitting unit group ZE to which light-emitting data signals are to be first written in the current frame period II is staggered with the writing phase of the light-emitting unit group ZE to which light-emitting data signals are last written in the previous frame period I, thereby avoiding the backlight abnormality caused by the mischarging of the light-emitting data signals, and improving the display effect of the display apparatus.

The foregoing descriptions mainly introduce the solutions provided by the embodiments of the present disclosure from perspective of method. In order to achieve the above functions, corresponding hardware structures and/or software modules for performing various functions are included. Those skilled in the art may easily realize that the present disclosure may be implemented in hardware or in a combination of hardware and computer software with reference to algorithmic steps of various examples described in the embodiments disclosed herein. Whether a certain function is performed by hardware or computer software driving hardware depends on specific application and design constraints of the technical solution. A skilled person may use different methods for each specific application to implement the described functions, but such implementation should not be considered beyond the scope of the present disclosure.

Figure 14:
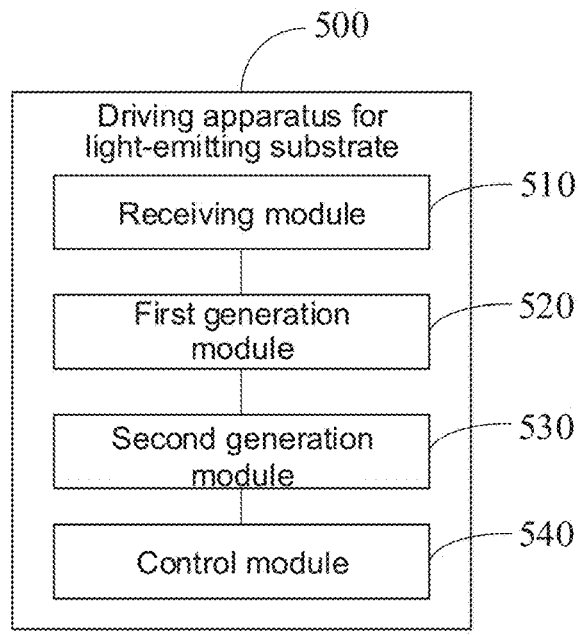
FIG. 14 is a structural diagram of a driving device for a light-emitting substrate, in accordance with some embodiments.

As shown in FIG. 14, some embodiments of the present disclosure provide a driving apparatus 500 for a light-emitting substrate. The driving apparatus 500 for the light-emitting substrate is used to perform the above-described driving method for the light-emitting substrate. The driving apparatus 500 for the light-emitting substrate includes a receiving module 510, a first generation module 520, a second generation module 530, and a control module 540.

The receiving module 510 is configured to receive a frequency modulation signal.

The first generation module 520 is configured to generate a frequency modulation synchronization signal corresponding to the frequency modulation signal.

The second generation module 530 is configured to generate an auxiliary synchronization signal in a case where a rising edge of the frequency modulation synchronization signal is in a writing phase of a light-emitting unit group to which light-emitting data signals are last written in a previous frame period I.

The control module 540 is configured to control, based on the auxiliary synchronization signal, a writing phase of a light-emitting unit group to which light-emitting data signals are to be first written in a current frame period II to be staggered with the writing phase of the light-emitting unit group to which light-emitting data signals are last written in the previous frame period I.

Here, the light-emitting unit group to which light-emitting data signals are last written in the previous frame period I belongs to the same light-emitting unit cluster as the light-emitting unit group to which light-emitting data signals are to be first written in the current frame period II.

In the driving method for the light-emitting substrate that is provided by the present disclosure, the auxiliary synchronization signal is generated in the case where the rising edge of the frequency modulation synchronization signal is in the writing phase of the light-emitting unit group to which light-emitting data signals are last written in the previous frame period I. In this way, the writing phase of the light-emitting unit group to which light-emitting data signals are to be first written in the current frame period II is staggered with the writing phase of the light-emitting unit group to which light-emitting data signals are last written in the previous frame period I, thereby avoiding the backlight abnormality caused by the mischarging of the light-emitting data signals, and improving the display effect of the display apparatus.

In some embodiments, the second generation module 530 is further configured to generate the auxiliary synchronization signal whose rising edge is after the writing phase of the light-emitting unit group to which light-emitting data signals are last written in the previous frame period I.

In these embodiments, the rising edge of the auxiliary synchronization signal is located after the writing phase of the light-emitting unit group ZE to which light-emitting data signals are last written in the previous frame period I, so that the total of the light-emitting data signals can be written to the light-emitting unit group to which light-emitting data signals are last written in the previous frame period I, so as to avoid the problem of the abnormal light emission of the light-emitting unit group to which light-emitting data signals are last written in the previous frame period I.

Figure 15:
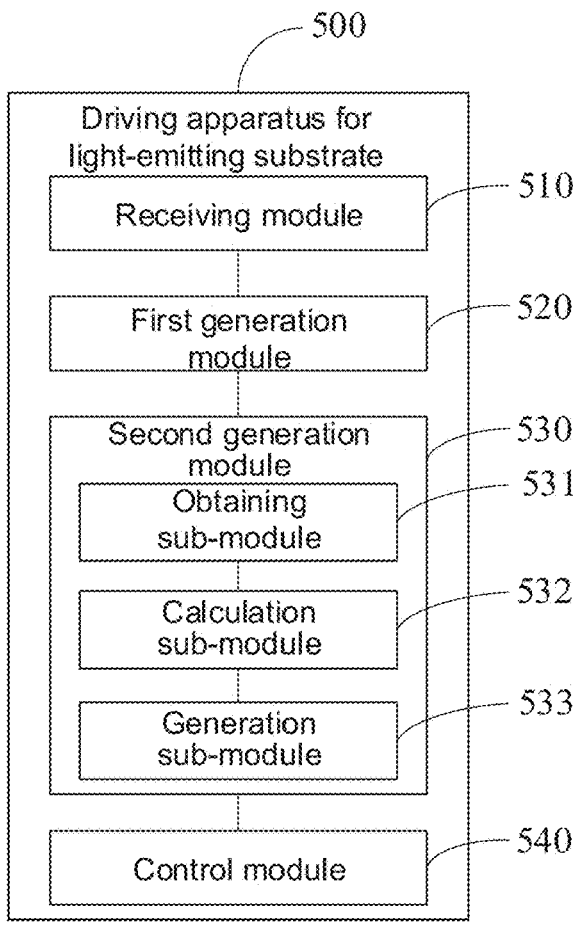
FIG. 15 is a structural diagram of another driving device for a light-emitting substrate, in accordance with some embodiments.

In some embodiments, as shown in FIG. 15, the second generation module 530 includes an obtaining sub-module 531, a calculation sub-module 532, and a generation sub-module 533.

The obtaining sub-module 531 is configured to obtain a start writing time point and a preset writing duration of the light-emitting unit group to which light-emitting data signals are last written in the previous frame period I.

The calculation sub-module 532 is configured to perform calculation, based on the start writing time point and the preset writing duration of the light-emitting unit group to which light-emitting data signals are last written in the previous frame period I, to obtain a target time point, a time interval between the target time point and the start writing time point of the light-emitting unit group to which light-emitting data signals are last written in the previous frame period I being greater than the preset writing duration.

The generation sub-module 533 is configured to generate the auxiliary synchronization signal whose rising edge is at a time point same as the target time point.

In these embodiments, in a case where the time interval between the target time point and the start writing time point of the light-emitting unit group to which light-emitting data signals are last written in the previous frame period I is equal to the sum of the preset writing duration of the light-emitting unit group to which light-emitting data signals are last written in the previous frame period I and the preset interval duration between the writing phases of two adjacent light-emitting unit groups, the continuity of sequential writing of the light-emitting unit groups can be improved, and the smoothness of images displayed by the display apparatus can be improved.

Figure 16:
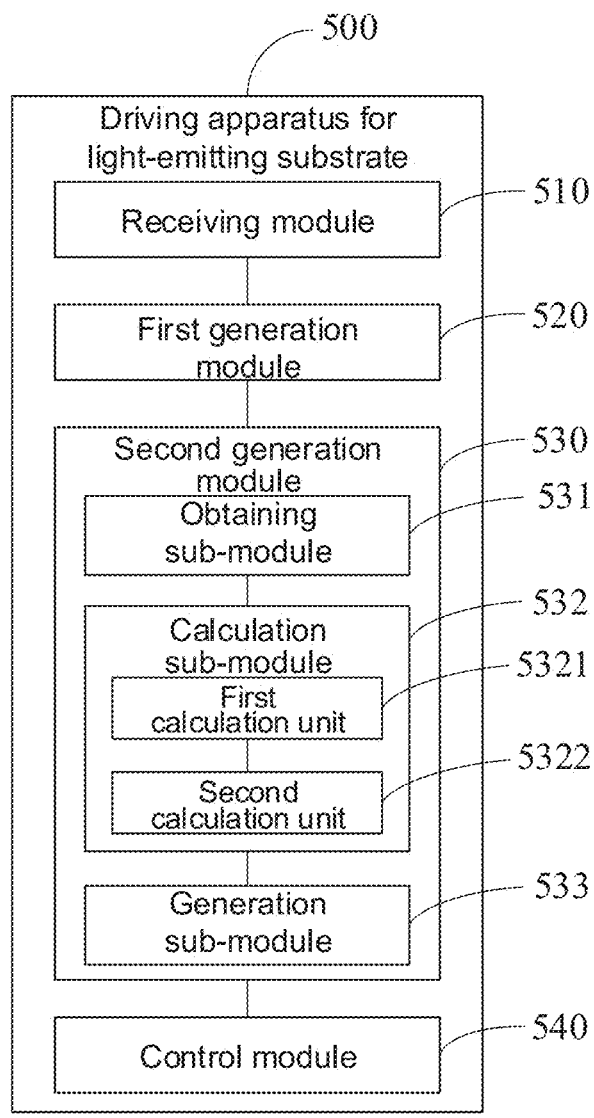
FIG. 16 is a structural diagram of yet another driving device for a light-emitting substrate, in accordance with some embodiments.

In some embodiments, as shown in FIG. 16, the calculation sub-module 532 includes a first calculation unit 5321 and a second calculation unit 5322.

The first calculation unit 5321 is configured to calculate a target time interval between start writing time points of two light-emitting unit groups to which light-emitting data signals are adjacently written in the previous frame period I.

The second calculation unit 5322 is configured to add the target time interval to the start writing time point of the light-emitting unit group to which light-emitting data signals are last written in the previous frame period I, to obtain the target time point.

In these embodiments, in a case where the display apparatus receives a frequency modulation signal, a time interval between writing phases of light-emitting unit groups to which light-emitting data signals are continuously written remains stable, ensuring the smoothness of images displayed by the display apparatus.

In some embodiments, the second generation module 530 is further configured to use a signal duration of the obtained frequency modulation synchronization signal as a signal duration of the auxiliary synchronization signal.

In these embodiments, the signal duration of the frequency modulation synchronization signal is used as the signal duration of the auxiliary synchronization signal, so that the auxiliary synchronization signal is equivalent to a frequency modulation synchronization signal that undergoes a delay, and this delay enables the writing phase of the light-emitting unit group to which light-emitting data signals are last written in the previous frame period I to be completed smoothly.

In some embodiments, the control module 540 is further configured to control, when the rising edge of the auxiliary synchronization signal arrives, the light-emitting unit group that is required to write the light-emitting data signals first in the current frame period II to start to write the light-emitting data signals.

In these embodiments, it is possible to make the writing phase of the light-emitting unit group to which light-emitting data signals are last written in the previous frame period I before the writing phase of the light-emitting unit group to which light-emitting data signals are to be first written in the current frame period II, thereby avoiding the backlight abnormality caused by the mischarging of the light-emitting data signals, and improving the display effect of the display apparatus.

Figure 17:
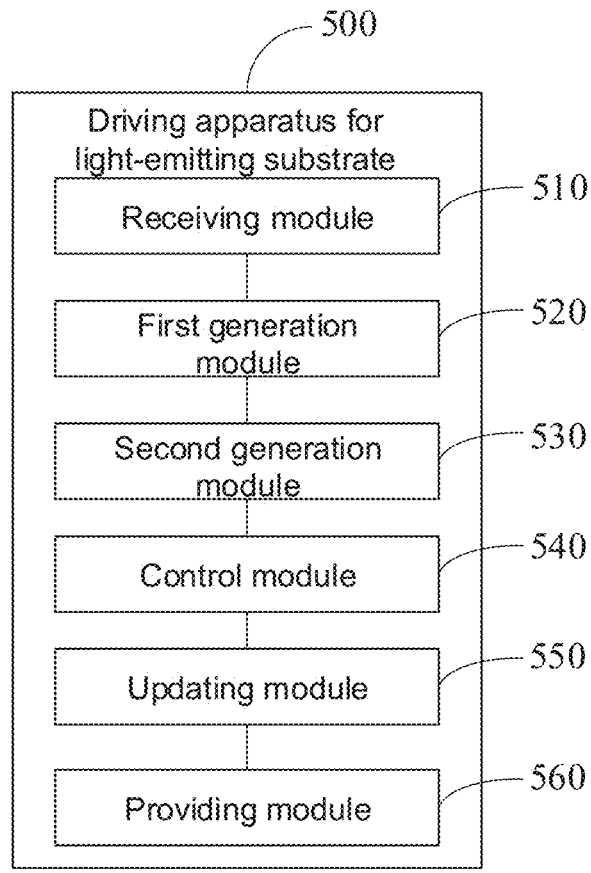
FIG. 17 is a structural diagram of still another driving device for a light-emitting substrate, in accordance with some embodiments.

In some embodiments, as shown in FIG. 17, the driving apparatus 500 for the light-emitting substrate further includes an updating module 550 and a providing module 560.

The updating module 550 is configured to update light-emitting data signals, after the writing phase of the light-emitting unit group to which light-emitting data signals are last written in the previous frame period I, and before the writing phase of the light-emitting unit group to which light-emitting data signals are to be first written in the current frame period II.

The providing module 560 is configured to provide the updated light-emitting data signals, using the M second signal lines, to the light-emitting unit group to which light-emitting data signals are to be first written in the current frame period II, within the writing phase of the light-emitting unit group to which light-emitting data signals are to be first written in the current frame period II.

In these embodiments, by updating the light-emitting data signals by the updating module 550 after the writing phase of the light-emitting unit group to which light-emitting data signals are last written in the previous frame period I, and before the writing phase of the light-emitting unit group to which light-emitting data signals are to be first written in the current frame period II, the updating of the light-emitting data signals can be prevented from causing an abnormality in the writing of the light-emitting unit group.

In some embodiments, the light-emitting unit group to which light-emitting data signals are to be first written in the current frame period II is a light-emitting unit group next to the light-emitting unit group to which light-emitting data signals are last written in a writing sequence of light-emitting unit groups corresponding to the previous frame period I.

In these embodiments, the light-emitting unit group that writes no light-emitting data signal in the previous frame period I will still write light-emitting data signals in accordance with the order of sequential writing of the light-emitting unit groups in the previous frame period I, and will not write the light-emitting data signals once less than other light-emitting unit groups, so as to avoid the problem of missing backlight refreshing, and to improve the display effect of the display apparatus.

Figure 18A:
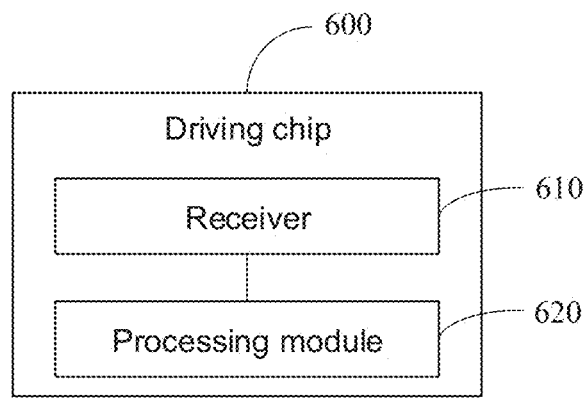
FIG. 18A is a structural diagram of a driving chip, in accordance with some embodiments.

In conjunction with FIG. 18A, some embodiments of the present disclosure provide a driving chip 600. The driving chip 600 is configured to drive a light-emitting substrate 400 to emit light. The driving chip 600 includes a receiver 610 and a processing module 620 that are electrically connected to each other, with the processing module 620 being further electrically connected to the light-emitting substrate 400.

The receiver 610 is configured to receive a frequency modulation synchronization signal.

The processing module 620 is configured to: generate an auxiliary synchronization signal in a case where a rising edge of the frequency modulation synchronization signal is in a writing phase of a light-emitting unit group to which light-emitting data signals are last written in a previous frame period I; and control, based on the auxiliary synchronization signal, a writing phase of a light-emitting unit group to which light-emitting data signals are to be first written in a current frame period II to be staggered with the writing phase of the light-emitting unit group to which the light-emitting data signals are last written in the previous frame period I.

Here, the light-emitting unit group to which light-emitting data signals are last written in the previous frame period I belongs to the same light-emitting unit cluster as the light-emitting unit group to which light-emitting data signals are to be first written in the current frame period II.

The driving chip 600 can cooperate with the timing control circuit 220. The timing control circuit 200 receives a frequency modulation signal, and generates a frequency modulation synchronization signal corresponding to the frequency modulation signal. In a case where the driving chip 600 receives the frequency modulation synchronization signal, the driving chip 600 can drive the writing phase of the light-emitting unit group in the light-emitting substrate to which light-emitting data signals are last written in the previous frame period I to be staggered with the writing phase of the light-emitting unit group in the light-emitting substrate to which light-emitting data signals are to be first written in the current frame period II, thereby avoiding the backlight abnormality caused by the mischarging of the light-emitting data signals, ensuring the normal light emission of the light-emitting substrate, and improving the display effect of the display apparatus.

Figure 18B:
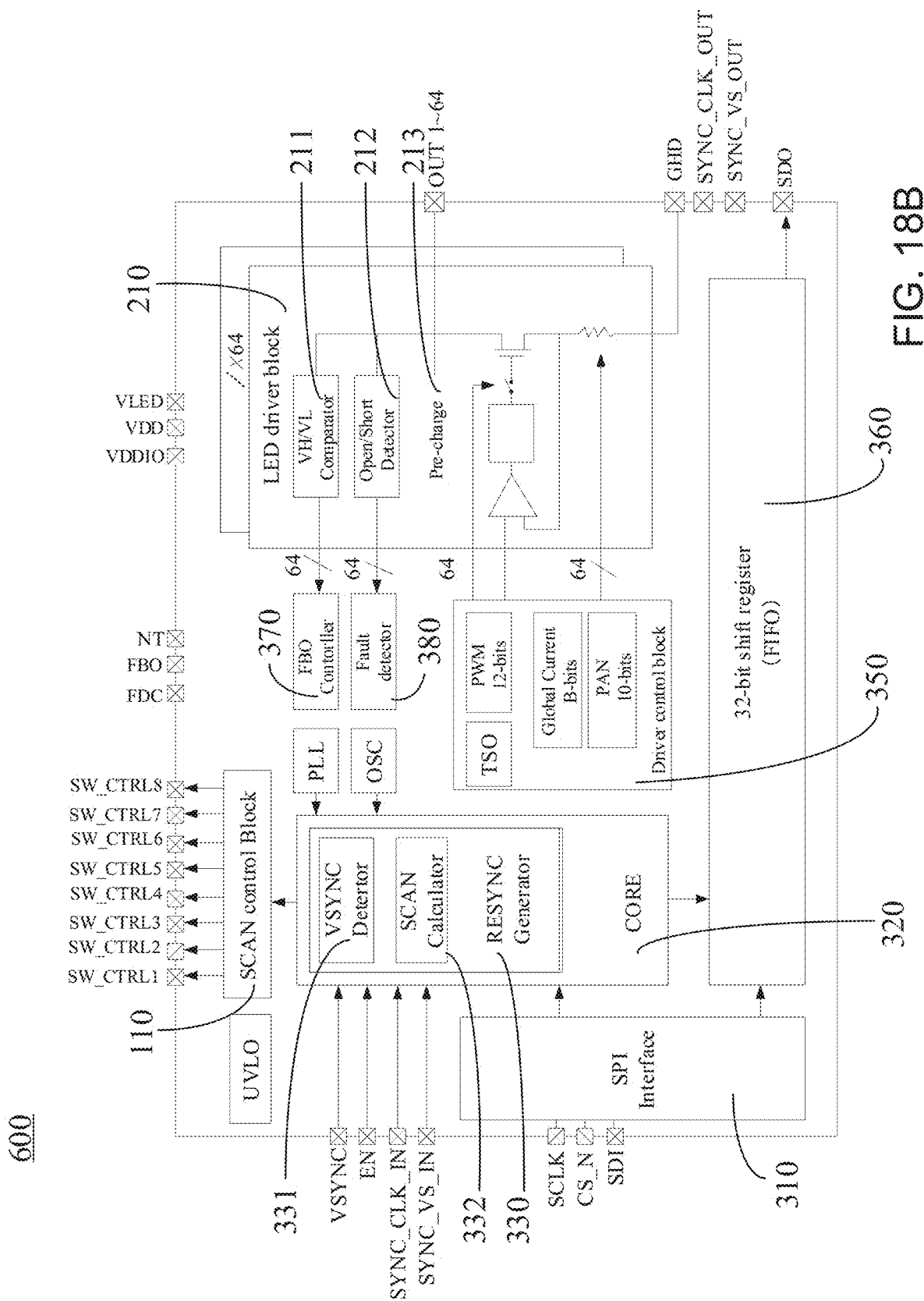
FIG. 18B is a structural diagram of hardware within a driving chip, in accordance with some other embodiments.

In some embodiments, referring to FIG. 18B, FIG. 18B is a structural diagram of hardware of a driving chip in accordance with some other embodiments. The driving chip 600 includes a data interface 310, an auxiliary synchronization signal generation circuit 330, and a scan control module 110.

The data interface 310 is configured to be coupled to the timing control circuit 220 to receive a frequency modulation synchronization signal and image data.

The auxiliary synchronization signal generation circuit 330 is electrically connected to the data interface 310. The auxiliary synchronization signal generation circuit 330 is configured to generate an auxiliary synchronization signal in a case where a rising edge of the frequency modulation synchronization signal is in a writing phase of a light-emitting unit group to which light-emitting data signals are last written in a previous frame period.

The scan control module 110 is electrically connected to the auxiliary synchronization signal generation circuit 330. The scan control module 110 is configured to control, based on the auxiliary synchronization signal, a writing phase of a light-emitting unit group to which light-emitting data signals are to be first written in a current frame period II to be staggered with the writing phase of the light-emitting unit group to which the light-emitting data signals are last written in the previous frame period I.

Here, the light-emitting unit group to which light-emitting data signals are last written in the previous frame period I belongs to the same light-emitting unit cluster as the light-emitting unit group to which light-emitting data signals are to be first written in the current frame period II.

The above data interface 310 may be a serial peripheral interface (SPI). The data interface 310 may be coupled to the timing control circuit 220 to receive the frequency modulation synchronization signal and the image data which are provided by the timing control circuit 220.

A core (CORE) 320 is electrically connected to the SPI interface to obtain a frequency modulation synchronization signal TP and generate an auxiliary synchronization signal (RESYNC) corresponding to the frequency modulation synchronization signal TP. Specifically, the core 320 includes an auxiliary synchronization signal generation circuit (RESYNC Generator) 330, and the auxiliary synchronization signal generation circuit 330 generates the auxiliary synchronization signal (RESYNC) based on the frequency modulation synchronization signal TP.

The auxiliary synchronization signal generation circuit 330 includes a vertical synchronization signal detector (VSYNC Detector) 331 and a scan calculator (SCAN calculator) 332. The vertical synchronization signal detector 331 is used to detect a vertical synchronization signal (VSYNC, including the frequency modulation synchronization signal TP), and determine whether a rising edge of the vertical synchronization signal is in a writing phase of a certain light-emitting unit group. The scan calculator 332 performs calculation based on data parameters obtained through detection of the vertical synchronization signal detector 331, to obtain a generation time of the auxiliary synchronization signal.

The scan control module (SCAN control block) 110 is electrically connected to the auxiliary synchronization signal generation circuit 330. The scan control module 110 is electrically connected to the plurality of light-emitting unit groups in the light-emitting substrate 400 via the N first signal lines GL. The scan control module 110, based on the auxiliary synchronization signal (which can be understood as the second control signal as stated before), provides driving signals to multiple light-emitting unit groups in a light-emitting unit cluster to cause the multiple light-emitting unit groups in the light-emitting unit cluster to enter into a writing phase in time-division.

The manner in which the scan control module 110 controls, based on the auxiliary synchronization signal, the writing phase of the light-emitting unit group to which light-emitting data signals are to be first written in the current frame period to be staggered with the writing phase of the light-emitting unit group to which light-emitting data signals are last written in the previous frame period has been described in detail previously and will not be repeated herein.

In some embodiments, as shown in FIG. 18B, the driving chip 600 further includes a driving control circuit 350 and a driving module 210.

The driving control circuit 350 is electrically connected to the auxiliary synchronization signal generation circuit 330. The driving control circuit 350 is configured to obtain the image data and the auxiliary synchronization signal, and perform calculation to obtain light-emitting data and an operation timing corresponding to the image data.

The driving module 210 is electrically connected to the driving control circuit 350 and electrically connected to the light-emitting unit groups in the light-emitting substrate through the M second signal line DL. The driving module 210 is configured to obtain the light-emitting data and an operation timing (which can be understood as the first control signal as stated before), and provide light-emitting data signals corresponding to the light-emitting data to the light-emitting unit groups in the light-emitting substrate.

The driving control circuit (Driver control block) 350 is electrically connected to the core 320, to obtain the image data provided by the timing control circuit 220 and the auxiliary synchronization signal provided by the auxiliary synchronization signal generation circuit 330. The image data includes light-emitting data of each light-emitting unit group corresponding to each display image of a frame. The driving control circuit 350 is used to obtain the image data and the auxiliary synchronization signal; and perform binary parsing on the image data, and perform timing parsing on the auxiliary synchronization signal, so as to obtain binary light-emitting data and an operation timing corresponding to each second signal line DL.

The driving module (LED driver block) 210 is electrically connected to the driving control circuit 350 to obtain the binary light-emitting data and the operation timing. The driving module 210, based on the binary light-emitting data and circuit devices such as transistors, variable capacitors, and the like, provides electrical signals (i.e., light-emitting data signals) corresponding to the binary light-emitting data to a light-emitting unit group which is connected to second signal lines DL in accordance with the operation timing, so as to cause this light-emitting unit group to emit light in accordance with the received light-emitting data signals.

In addition, the driving module 210 further includes a high-low potential comparator (VH/VL Comparator) 211 electrically connected to an FBO controller 370 for adjusting backlight voltage. The driving module 210 further includes an open/short detector (Open/Short Detector) 212 electrically connected to a fault detector (Fault Detector) 380 for detecting whether there is an abnormality of an open or short circuit in the circuit. The driving module 210 further includes a pre-charge unit (Pre-charge) 213 is used to boost the boosting speed and discharge speed of a voltage in a second signal line DL.

The driving chip 600 may further include a shift register 360 for caching or transmitting digital serial interface (SDI) data.

The driving chip 600 can cooperate with the timing control circuit 220. The timing control circuit 200 receives a frequency modulation signal, and generates a frequency modulation synchronization signal corresponding to the frequency modulation signal. In a case where the driving chip 600 receives the frequency modulation synchronization signal, the driving chip 600 can drive the writing phase of the light-emitting unit group in the light-emitting substrate to which light-emitting data signals are last written in the previous frame period I to be staggered with the writing phase of the light-emitting unit group in the light-emitting substrate to which light-emitting data signals are to be first written in the current frame period II, thereby avoiding the backlight abnormality caused by the mischarging of the light-emitting data signals, ensuring the normal light emission of the light-emitting substrate, and improving the display effect of the display apparatus.

Figure 19:
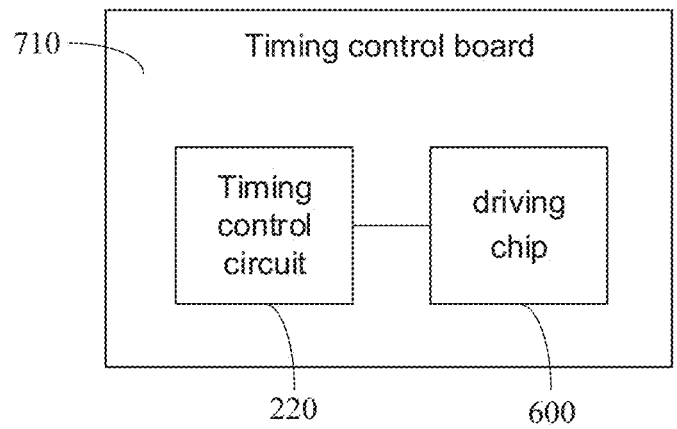
FIG. 19 is a structural diagram of a timing control board, in accordance with yet other embodiments.

In conjunction with FIG. 19, some embodiments of the present disclosure provide a timing control board 700. The timing control board 700 includes a first substrate 710, a timing control circuit 220, and a driving chip 600.

The timing control circuit 220 is located on the first substrate 710. The timing control circuit 220 is configured to receive a frequency modulation signal, and generate a frequency modulation synchronization signal corresponding to the frequency modulation signal.

The driving chip 600 is the driving chip 600 as described above, which is located on the first substrate 710 and electrically connected to the timing control circuit 220.

In these embodiments, the driving chip 600 is integrated on the first substrate of the timing control board 700.

The timing control board 700 is capable of receiving the frequency modulation signal using the timing control circuit 220, and then the frequency modulation synchronization signal corresponding to the frequency modulation signal is generated by the timing control circuit 220. The timing control board 700 is further capable of receiving the frequency modulation synchronization signal using the driving chip 600, and controlling, based on an auxiliary synchronization signal, a writing phase of a light-emitting unit group to which light-emitting data signals are to be first written in a current frame period I to be staggered with a writing phase of a light-emitting unit group to which light-emitting data signals are last written in a previous frame period II.

How to specifically control, through the auxiliary synchronization signal, the writing phase of the light-emitting unit group to which light-emitting data signals are to be first written in the current frame period I to be staggered with the writing phase of the light-emitting unit group to which light-emitting data signals are last written in the previous frame period II, has been described in detail previously and will not be repeated herein.

In this way, in a case where the timing control board 700 receives the frequency modulation synchronization signal, the timing control board 700 can drive the writing phase of the light-emitting unit group in the light-emitting substrate to which light-emitting data signals are last written in the previous frame period I to be staggered with the writing phase of the light-emitting unit group in the light-emitting substrate to which light-emitting data signals are to be first written in the current frame period II, thereby avoiding the problem of mischarging of the light-emitting data signals, ensuring the normal light emission of the light-emitting substrate, and improving the display effect of the display apparatus.

Figure 20:
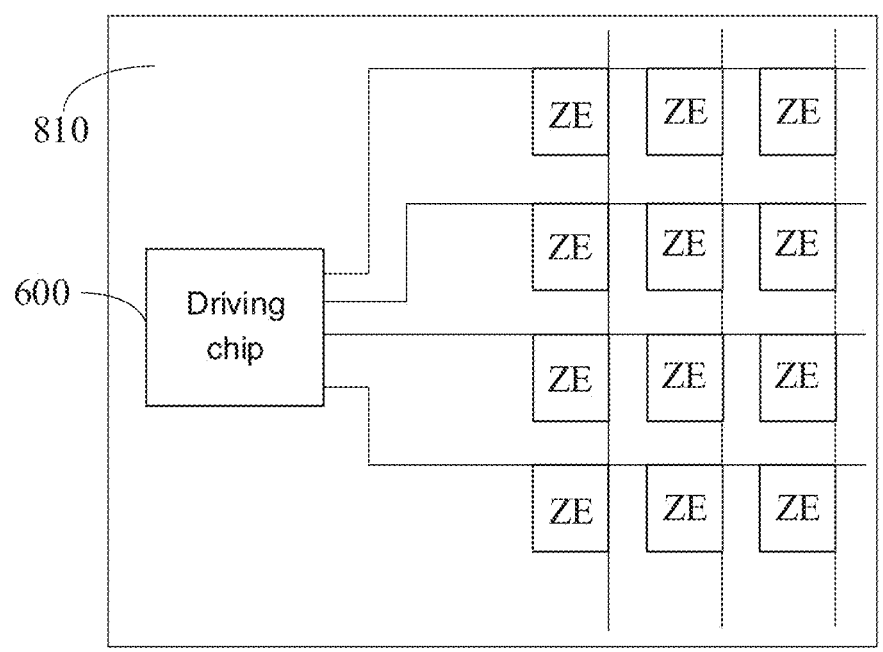
FIG. 20 is a structural diagram of a timing control board, in accordance with yet other embodiments.

As shown in FIG. 20, some embodiments of the present disclosure provide a light-emitting substrate 800. The light-emitting substrate 800 includes a second substrate 810, a plurality of light-emitting unit groups ZE, and a driving chip 600.

The light-emitting unit groups ZE are located on the second substrate 810. The driving chip 600 is located on the second substrate 810 and is electrically connected to the plurality of light-emitting unit groups ZE.

In these embodiments, the driving chip 600 is integrated on the second substrate 810 of the light-emitting substrate 800.

The light-emitting substrate 800 is capable of receiving the frequency modulation synchronization signal using the driving chip 600, and controlling, based on an auxiliary synchronization signal, a writing phase of a light-emitting unit group ZE to which light-emitting data signals are to be first written in a current frame period I to be staggered with a writing phase of a light-emitting unit group ZE to which light-emitting data signals are last written in a previous frame period II.

How to specifically control, through the auxiliary synchronization signal, the writing phase of the light-emitting unit group to which light-emitting data signals are to be first written in the current frame period I to be staggered with the writing phase of the light-emitting unit group to which light-emitting data signals are last written in the previous frame period II, has been described in detail previously and will not be repeated herein.

In this way, in a case where the timing control board 700 receives the frequency modulation synchronization signal, the light-emitting substrate 800 is capable of realizing that the writing phase of the light-emitting unit group ZE to which light-emitting data signals are last written in the previous frame period I is staggered with the writing phase of the light-emitting unit group ZE to which light-emitting data signals are to be first written in the current frame period II, thereby avoiding the problem of the mischarging of the light-emitting data signals, ensuring the normal light emission of the light-emitting substrate, and improving the display effect of the display apparatus.

Figure 21:
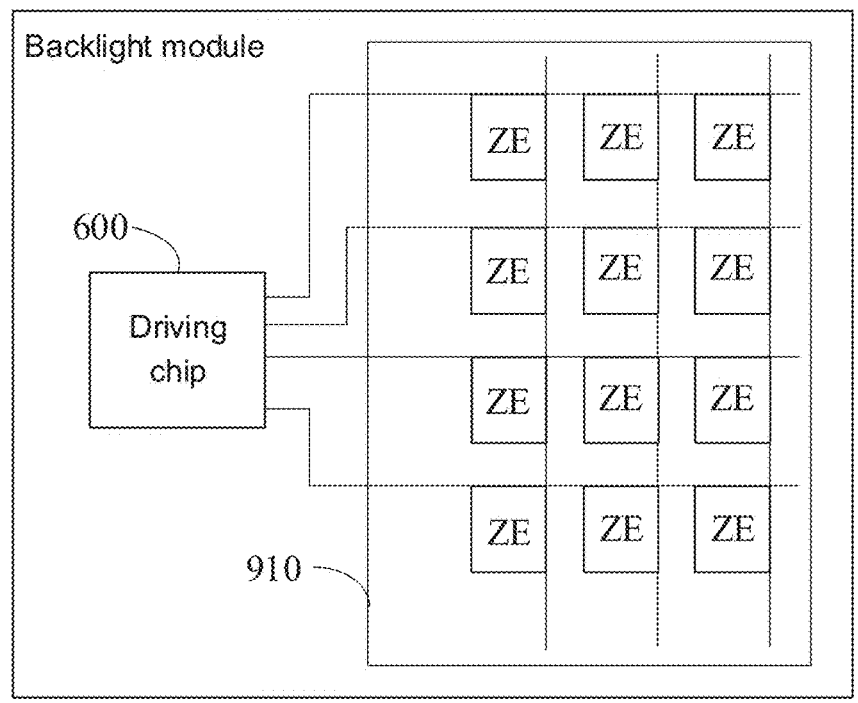
FIG. 21 is a structural diagram of a backlight module, in accordance with some embodiments.

As shown in FIG. 21, some embodiments of the present disclosure provide a backlight module 900. The backlight module 900 includes a light-emitting substrate 910 and a driving chip 600.

The driving chip is the driving chip 600 as described above, and the driving chip 600 is electrically connected to the light-emitting substrate 910.

In this way, in a case where the backlight module 900 receives the frequency modulation synchronization signal, the light-emitting substrate 910 is capable of realizing that a writing phase of a light-emitting unit group ZE to which light-emitting data signals are last written in a previous frame period I is staggered with a writing phase of a light-emitting unit group ZE to which light-emitting data signals are to be first written in a current frame period II, thereby avoiding the problem of the mischarging of the light-emitting data signals, ensuring the normal light emission of the light-emitting substrate, and improving the display effect of the display apparatus.

Figure 22A:
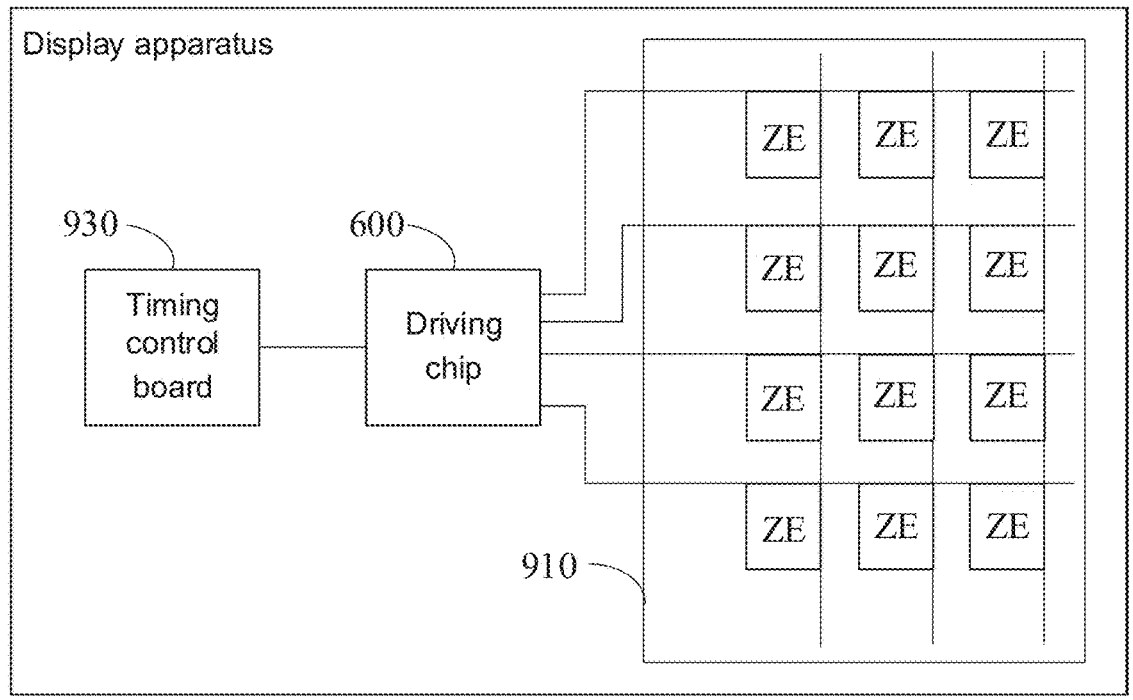
FIG. 22A is a structural diagram of a display apparatus, in accordance with some embodiments.

As shown in FIG. 22A, some embodiments of the present disclosure provide a display apparatus 1000. The display apparatus 1000 includes a light-emitting substrate 910, a driving chip 600, and a timing control board 930.

The driving chip is the driving chip 600 as described above, and the driving chip 600 is electrically connected to both the light-emitting substrate 910 and the timing control board 930.

The timing control board 930 receives a frequency modulation signal, and generates a frequency modulation synchronization signal corresponding to the frequency modulation signal. The driving chip 600 receives the frequency modulation synchronization signal, and controls, based on an auxiliary synchronization signal, a writing phase of a light-emitting unit group ZE to which light-emitting data signals are to be first written in a current frame period I to be staggered with a writing phase of a light-emitting unit group ZE to which light-emitting data signals are last written in a previous frame period II.

In this way, in a case where the display apparatus 1000 receives the frequency modulation synchronization signal, the light-emitting substrate 910 is capable of realizing that the writing phase of the light-emitting unit group ZE to which light-emitting data signals are last written in the previous frame period I is staggered with the writing phase of the light-emitting unit group ZE to which light-emitting data signals are to be first written in the current frame period II, thereby avoiding the problem of mischarging of the light-emitting data signals, ensuring the normal light emission of the light-emitting substrate, and improving the display effect of the display apparatus.

Figure 22B:
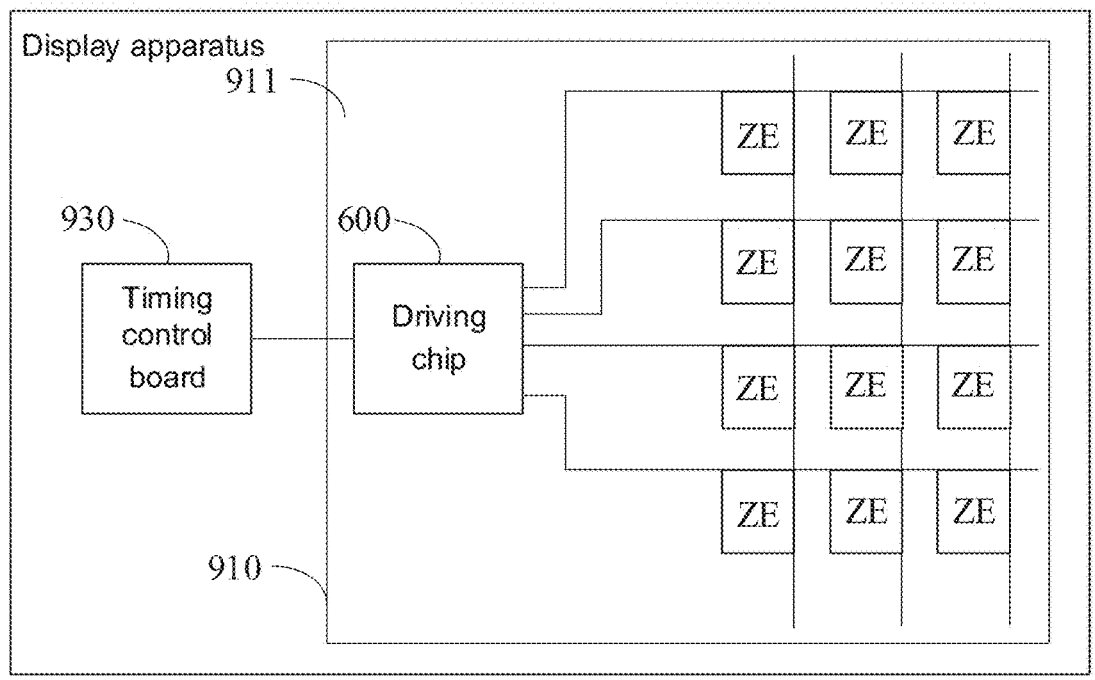
FIG. 22B is a structural diagram of another display apparatus, in accordance with some embodiments.

In some embodiments, as shown in FIG. 22B, the driving chip 600 is integrated on the light-emitting substrate 910. The light-emitting substrate 910 includes a second substrate 911, and a plurality of light-emitting unit groups ZE located on the second substrate 911. Moreover, the driving chip 600 is likewise located on the second substrate 911 and is electrically connected to the plurality of light-emitting unit groups ZE.

Figure 22C:
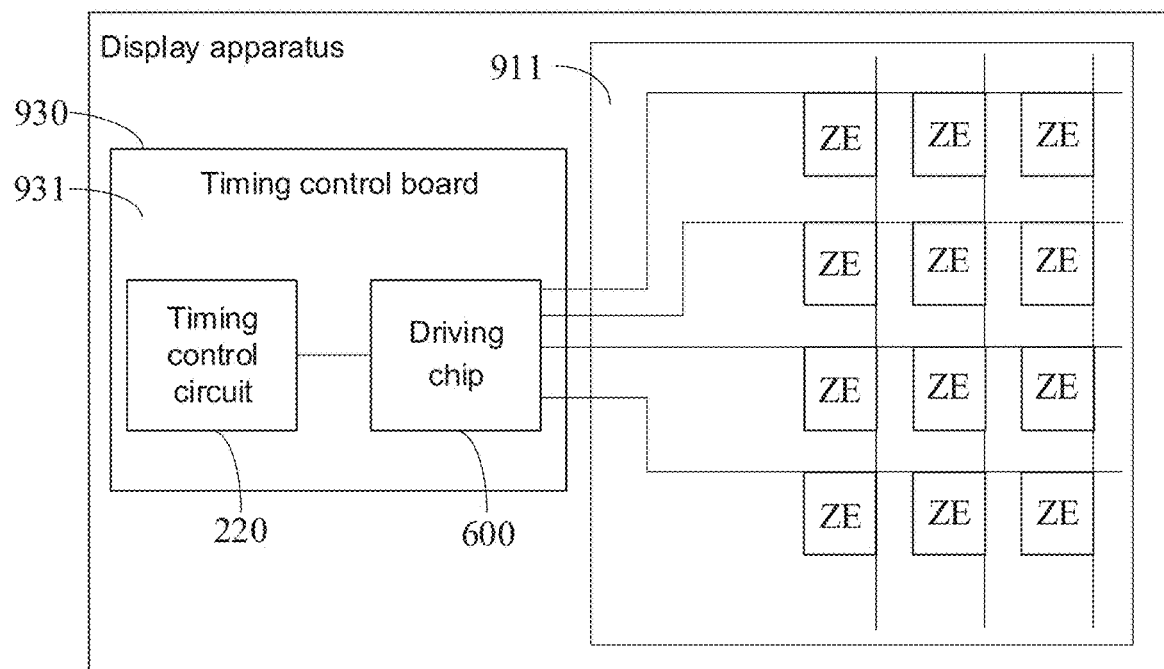
FIG. 22C is a structural diagram of yet another display apparatus, in accordance with some embodiments.

In some embodiments, as shown in FIG. 22C, the driving chip 600 is integrated on the timing control board 930. The light-emitting substrate 910 includes a second substrate 911, and a plurality of light-emitting unit groups ZE located on the second substrate 911. Moreover, the timing control board 930 includes a first substrate 931, and the driving chip 600 is located on the first substrate 710 and is electrically coupled to the timing control circuit 220. The driving chip 600 is further electrically connected to the plurality of light-emitting unit groups ZE.

The first substrate 931 may be a flexible printed circuit (FPC) board, and the FPC may be bonded to the second substrate 911 of the light-emitting substrate 910 to realize the connect of electrical signal transmission paths. Further, the FPC may be bent to be bonded to a side of the second substrate 911 away from the light-emitting side, which may narrow the bezel width of the light-emitting substrate 910, facilitating the realization of a narrow bezel of the display apparatus.

Figure 23:
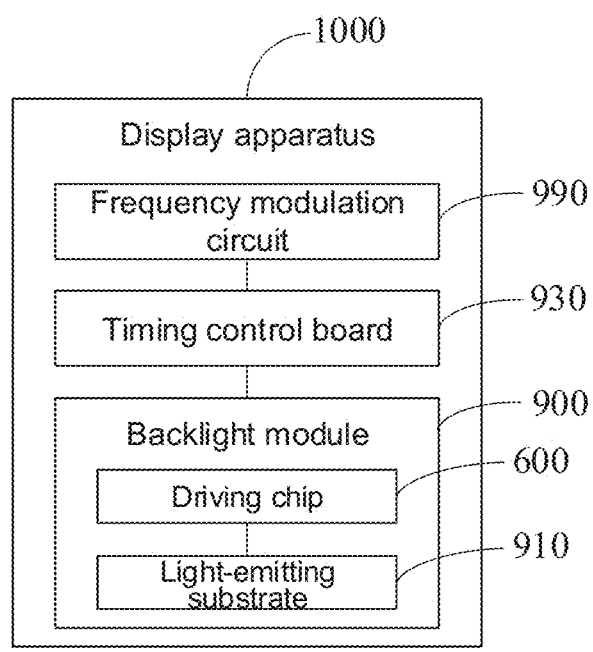
FIG. 23 is a structural diagram of a display apparatus, in accordance with some embodiments.

In conjunction with FIG. 23, some embodiments of the present disclosure provide a display apparatus 1000. The display apparatus 1000 includes a backlight module 900, a timing control board 930, and a frequency modulation circuit 990.

The backlight module 900 is the backlight module 900 as described above. The timing control board 930 is electrically connected to the driving chip 600 of the backlight module 900. The frequency modulation circuit 990 is configured to provide a frequency modulation signal. The frequency modulation circuit 990 is electrically connected to the timing control board 930 of the backlight module 900 to provide the frequency modulation signal to the timing control board 930.

The timing control board 930 receives the frequency modulation signal, and generates a frequency modulation synchronization signal corresponding to the frequency modulation signal. The driving chip 600 receives the frequency modulation synchronization signal, and controls, based on an auxiliary synchronization signal, a writing phase of a light-emitting unit group ZE to which light-emitting data signals are to be first written in a current frame period I to be staggered with a writing phase of a light-emitting unit group ZE to which light-emitting data signals are last written in a previous frame period II.

In this way, in a case where the frequency modulation circuit 990 of the display apparatus 1000 provides the frequency modulation signal to the timing control board 930, the light-emitting substrate is capable of realizing that the writing phase of the light-emitting unit group ZE to which light-emitting data signals are last written in the previous frame period I is staggered with the writing phase of the light-emitting unit group ZE to which light-emitting data signals are to be first written in the current frame period II, thereby avoiding the backlight abnormality caused by the mischarging of the light-emitting data signals, and improving the display effect of the display apparatus.

Figure 24:
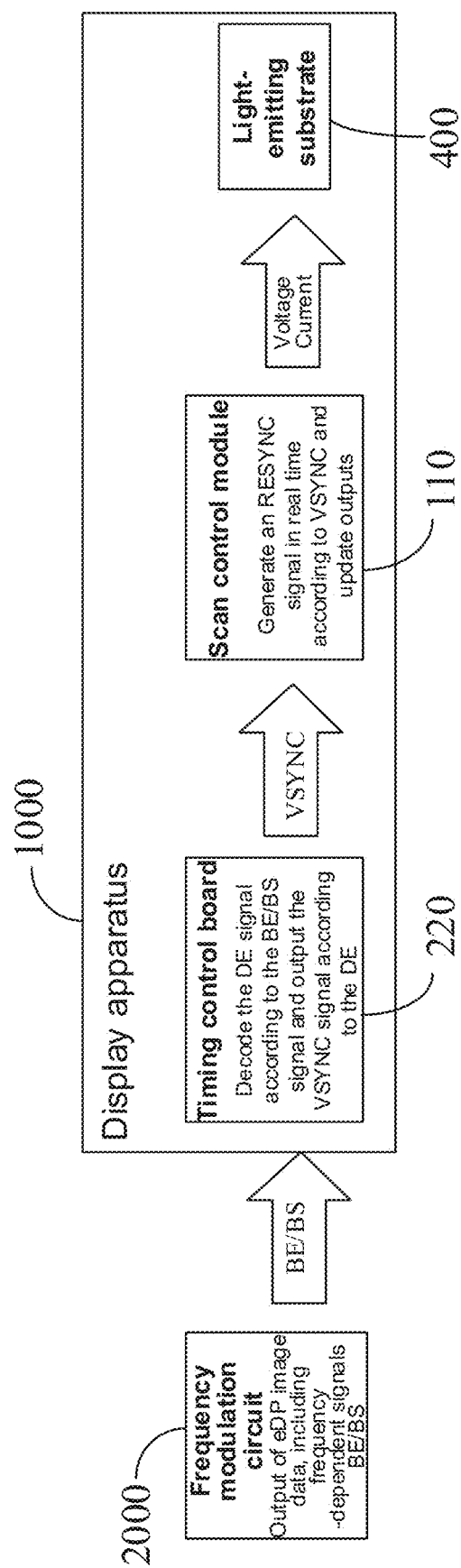
FIG. 24 is a diagram showing a connection between a display apparatus and a frequency modulation circuit, in accordance with some embodiments.

In conjunction with FIG. 24, some embodiments of the present disclosure provide a display apparatus 1000. The apparatus device 1000 is electrically connected to an external frequency modulation circuit 2000. The frequency modulation circuit 2000 may be a circuit capable of changing the display frequency of the display frequency modulation, such as a graphics card, an APU (accelerated processor), or the like.

The display apparatus 1000 includes a timing control circuit 220, a scan control module 110, and a light-emitting substrate 400 which are electrically connected in sequence.

The frequency modulation circuit 2000 provides a start signal (Blanking Start, BS) of an interval period between two adjacent frames and an end signal (Blanking End, BE) of the interval period. The timing control circuit 220 can determine a frame rate corresponding to the frequency modulation signal through the BS and BE signals, and generate a frequency synchronization signal (VSYNC) based on the frequency synchronization signal.

The scan control module 110 generates an auxiliary synchronization signal (RESYNC) based on the frequency modulation synchronization signal and provides, based on the auxiliary synchronization signal, the driving signals to the light-emitting substrate 400 using the first signal lines GL in time-division. Multiple light-emitting unit groups ZE in a light-emitting unit cluster QE in the light-emitting substrate 400 enter a writing phase in time-division in accordance with the driving signals, and then obtain corresponding light-emitting data signals in-division. Each light-emitting unit group ZE emits light in accordance with the obtained light-emitting data signal to realize an image display.

Some embodiments of the present disclosure provide a computer-readable storage medium (e.g., a non-transitory computer-readable storage medium), the computer-readable storage medium stores therein computer program instructions that, when run on a processor, cause a processor to perform one or more steps in the driving method for the light-emitting substrate as described in any of the above embodiments.

For example, the computer-readable storage medium may include, but is not limited to, a magnetic storage device (e.g., a hard disk, a floppy disk, or a magnetic tape), an optical disk ((e.g., a compact disk (CD), a digital versatile disk (DVD)), a smart card and a flash memory device (e.g., an erasable programmable read-only memory (EPROM), a card, a stick, or a key driver). The various computer-readable storage media described in the present disclosure may represent one or more devices and/or other machine-readable storage media for storing information. The term "machine-readable storage medium" may include, but is not limited to, wireless channels and various other media capable of storing, containing, and/or carrying instructions and/or data.

Some embodiments of the present disclosure provide a computer program product. The computer program product includes computer program instructions that, when executed on a computer, cause the computer to perform one or more steps in the driving method for the light-emitting substrate as described in any of the above embodiments.

Some embodiments of the present disclosure further provide a computer program. When executed on a computer, the computer program causes the computer to perform one or more steps in the driving method for the light-emitting substrate as described in any of the above embodiments.

Beneficial effects of the computer-readable storage medium, the computer program product, and the computer program are the same as the beneficial effects of the driving method for the light-emitting substrate as described in the embodiments above, and will not be repeated here.

The above embodiments may be implemented in whole or in part through software, hardware, firmware, or any combination thereof. When implemented using a software program, the above embodiments may be implemented in whole or in part as a computer program product. The computer program product includes one or more computer instructions. When the computer instructions are loaded and executed on a computer, processes, or functions according to the embodiments of the present application are generated in whole or in part. The computer may be a general-purpose computer, a dedicated computer, a computer network, or any other programmable device. The computer instructions may be stored in a computer-readable storage medium, or transferred from one computer-readable storage medium to another computer-readable storage medium. For example, the computer instructions may be transferred from a website site, computer, server or data center to another website site, computer, server, or data center by means of wire (e.g., a coaxial cable, a fiber optic, a digital subscriber line (DSL)), or wireless (e.g., infrared, Wi-Fi, microwave, etc.). The computer-readable storage medium may be any available medium capable of being accessed by a computer, or a data storage device such as a server or a data center integrating by one or more available media. The available medium may be a magnetic medium (e.g., a floppy disk, a hard disk, a magnetic tape), an optical medium (e.g., a DVD), or a semiconductor medium (e.g., a solid state disk (SSD)), or the like.

The foregoing description is only specific embodiments of the present disclosure, but the scope of protection of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A driving method for a light-emitting substrate, wherein the light-emitting substrate comprises at least one light-emitting unit cluster, and N light-emitting unit groups in a light-emitting unit cluster are electrically connected to N first signal lines, respectively; M light-emitting units in a light-emitting unit group are electrically connected to M second signal lines, respectively; and the N light-emitting unit groups in the light-emitting unit cluster are connected to the same M second signal lines, N and M being both positive integers;

within a frame period, the N first signal lines provide driving signals to the N light-emitting unit groups in time-division to cause the N light-emitting unit groups to be in a writing phase in time-division; and within a writing phase of the light-emitting unit group, the M second signal lines provide light-emitting data signals to the M light-emitting units in the light-emitting unit group, simultaneously;

the driving method comprises:

receiving a frequency modulation signal;

generating a frequency modulation synchronization signal corresponding to the frequency modulation signal;

generating an auxiliary synchronization signal in a case where a rising edge of the frequency modulation synchronization signal is in a writing phase of a light-emitting unit group to which light-emitting data signals are last written in a previous frame period; and controlling, based on the auxiliary synchronization signal, a writing phase of a light-emitting unit group to which light-emitting data signals are to be first written in a current frame period to be staggered with the writing phase of the light-emitting unit group to which the light-emitting data signals are last written in the previous frame period;

wherein the light-emitting unit group to which the light-emitting data signals are last written in the previous frame period belongs to a same light-emitting unit cluster as the light-emitting unit group to which the light-emitting data signals are to be first written in the current frame period.

2. The driving method according to claim 1, wherein generating the frequency modulation synchronization signal comprises:

generating the auxiliary synchronization signal whose rising edge is after the writing phase of the light-emitting unit group to which the light-emitting data signals are last written in the previous frame period.

3. The driving method according to claim 2, wherein generating the auxiliary synchronization signal whose rising edge is after the writing phase of the light-emitting unit group to which the light-emitting data signals are last written in the previous frame period comprises:

obtaining a start writing time point and a preset writing duration of the light-emitting unit group to which the light-emitting data signals are last written in the previous frame period;

performing calculation, based on the start writing time point and the preset writing duration of the light-emitting unit group to which the light-emitting data signals are last written in the previous frame period, to obtain a target time point, a time interval between the target time point and the start writing time point of the light-emitting unit group to which the light-emitting data signals are last written in the previous frame period being greater than the preset writing duration; and generating the auxiliary synchronization signal whose rising edge is at a time point same as the target time point.

4. The driving method according to claim 3, wherein performing calculation, based on the start writing time point and the preset writing duration of the light-emitting unit group to which the light-emitting data signals are last written in the previous frame period, to obtain the target time point comprises:

calculating a target time interval between start writing time points of two light-emitting unit groups to which light-emitting data signals are adjacently written in the previous frame period; and adding the target time interval to the start writing time point of the light-emitting unit group to which the light-emitting data signals are last written in the previous frame period, to obtain the target time point.

5. The driving method according to claim 2, wherein generating the auxiliary synchronization signal whose rising edge is after the writing phase of the light-emitting unit group to which the light-emitting data signals are last written in the previous frame period further comprises:

using a signal duration of the obtained frequency modulation synchronization signal as a signal duration of the auxiliary synchronization signal.

6. The driving method according to claim 2, wherein controlling, based on the auxiliary synchronization signal, the writing phase of the light-emitting unit group to which the light-emitting data signals are to be first written in the current frame period to be staggered with the writing phase of the light-emitting unit group to which the light-emitting data signals are last written in the previous frame period comprises:

controlling, when the rising edge of the auxiliary synchronization signal arrives, the light-emitting unit group that is required to write the light-emitting data signals first in the current frame period to start to write the light-emitting data signals.

7. The driving method according to claim 1, further comprising:

updating light-emitting data signals, after the writing phase of the light-emitting unit group to which the light-emitting data signals are last written in the previous frame period, and before the writing phase of the light-emitting unit group to which the light-emitting data signals are to be first written in the current frame period; and providing the updated light-emitting data signals, using the M second signal lines, to the light-emitting unit group to which the light-emitting data signals are to be first written in the current frame period, within the writing phase of the light-emitting unit group to which the light-emitting data signals are to be first written in the current frame period.

8. The driving method according to claim 1, wherein the light-emitting unit group to which the light-emitting data signals are to be first written in the current frame period is a light-emitting unit group next to the light-emitting unit group to which the light-emitting data signals are last written in a writing sequence of light-emitting unit groups corresponding to the previous frame period.

9. A non-transitory computer-readable storage medium having stored computer program instructions that, when run at a processor, cause the processor to perform one or more steps in the driving method for the light-emitting substrate according to claim 1.

10. A driving chip configured to drive a light-emitting substrate to emit light, wherein the light-emitting substrate comprises at least one light-emitting unit cluster, and N light-emitting unit groups in a light-emitting unit cluster are electrically connected to N first signal lines, respectively; M light-emitting units in a light-emitting unit group are electrically connected to M second signal lines, respectively; and the N light-emitting unit groups in the light-emitting unit cluster are connected to the same M second signal lines, N and M being both positive integers;

within a frame period, the N first signal lines provide driving signals to the N light-emitting unit groups in time-division to cause the N light-emitting unit groups to be in a writing phase in time-division; and within a writing phase of the light-emitting unit group, the M second signal lines provide light-emitting data signals to the M light-emitting units in the light-emitting unit group, simultaneously;

the driving chip comprises a receiver and a processing module that are electrically connected to each other, and the processing module is further electrically connected to the light-emitting substrate, wherein the receiver is configured to receive a frequency modulation synchronization signal;

the processing module is configured to: generate an auxiliary synchronization signal in a case where a rising edge of the frequency modulation synchronization signal is in a writing phase of a light-emitting unit group to which light-emitting data signals are last written in a previous frame period; and control, based on the auxiliary synchronization signal, a writing phase of a light-emitting unit group to which light-emitting data signals are to be first written in a current frame period to be staggered with the writing phase of the light-emitting unit group to which the light-emitting data signals are last written in the previous frame period;

wherein the light-emitting unit group to which the light-emitting data signals are last written in the previous frame period belongs to a same light-emitting unit cluster as the light-emitting unit group to which the light-emitting data signals are to be first written in the current frame period.

11. A timing control board, comprising:
a first substrate;
a timing control circuit located on the first substrate, the timing control circuit being configured to receive a frequency modulation signal, and generate a frequency modulation synchronization signal corresponding to the frequency modulation signal; and
the driving chip according to claim 10, located on the first substrate and electrically connected to the timing control circuit.

12. A display apparatus, comprising:
a backlight module, comprising:
a light-emitting substrate; and
the driving chip according to claim 10, electrically connected to the light-emitting substrate;
a timing control board, electrically connected to the driving chip of the backlight module; and
a frequency modulation circuit, electrically connected to the timing control board to provide a frequency modulation signal to the timing control board.

13. A driving chip configured to drive a light-emitting substrate to emit light, wherein the light-emitting substrate comprises at least one light-emitting unit cluster, and N light-emitting unit groups in a light-emitting unit cluster are electrically connected to N first signal lines, respectively; M light-emitting units in a light-emitting unit group are electrically connected to M second signal lines, respectively; and the N light-emitting unit groups in the light-emitting unit cluster are connected to the same M second signal lines, N and M being both positive integers;

within a frame period, the N first signal lines provide driving signals to the N light-emitting unit groups in time-division to cause the N light-emitting unit groups to be in a writing phase in time-division; and within a writing phase of the light-emitting unit group, the M second signal lines provide light-emitting data signals to the M light-emitting units in the light-emitting unit group, simultaneously;

the driving chip comprises:
a data interface, configured to receive a frequency modulation synchronization signal and image data;
an auxiliary synchronization signal generation circuit, electrically connected to the data interface and configured to generate an auxiliary synchronization signal in a case where a rising edge of the frequency modulation synchronization signal is in a writing phase of a light-emitting unit group to which light-emitting data signals are last written in a previous frame period;
a scan control module, electrically connected to the auxiliary synchronization signal generation circuit and configured to control, based on the auxiliary synchronization signal, a writing phase of a light-emitting unit group to which light-emitting data signals are to be first written in a current frame period to be staggered with the writing phase of the light-emitting unit group to which the light-emitting data signals are last written in the previous frame period;
wherein the light-emitting unit group to which the light-emitting data signals are last written in the previous frame period belongs to a same light-emitting unit cluster as the light-emitting unit group to which the light-emitting data signals are to be first written in the current frame period.

14. The driving chip according to claim 13, further comprising:
a driving control circuit, electrically connected to the auxiliary synchronization signal generation circuit and configured to, obtain the image data and the auxiliary synchronization signal, and perform calculation to obtain light-emitting data corresponding to the image data; and a driving module, electrically connected to the driving control circuit and electrically connected to light-emitting unit groups in the light-emitting substrate through the M second signal lines, the driving module being configured to obtain the light-emitting data and provide light-emitting data signals corresponding to the light-emitting data to the light-emitting unit groups in the light-emitting substrate.

15. A timing control board, comprising:
a first substrate;
a timing control circuit located on the first substrate, the timing control circuit being configured to receive a frequency modulation signal, and generate a frequency modulation synchronization signal corresponding to the frequency modulation signal; and
the driving chip according to claim 13, located on the first substrate and electrically connected to the timing control circuit.

16. A light-emitting substrate, comprising:
a second substrate;
a plurality of light-emitting unit groups located on the second substrate; and
the driving chip according to claim 13, located on the second substrate and electrically connected to the plurality of light-emitting unit groups.

17. A backlight module, comprising:
a light-emitting substrate; and
the driving chip according to claim 13, electrically connected to the light-emitting substrate.

18. A display apparatus, comprising:
a light-emitting substrate;
the driving chip according to claim 13, electrically connected to the light-emitting substrate; and
a timing control board electrically connected to the driving chip.

19. The display apparatus according to claim 18, wherein the driving chip is integrated on the light-emitting substrate, or the driving chip is integrated on the timing control board.

20. A display apparatus, comprising:
the backlight module according to claim 17;
a timing control board electrically connected to the driving chip of the backlight module; and
a frequency modulation circuit electrically connected to the timing control board, to provide a frequency modulation signal to the timing control board.

* * * * *